United States Patent
Pollica et al.

(10) Patent No.: US 7,507,384 B2
(45) Date of Patent: Mar. 24, 2009

(54) PREFERENTIAL OXIDATION REACTOR TEMPERATURE REGULATION

(75) Inventors: Darryl Pollica, Medford, MA (US); William F. Northrop, Ann Arbor, MI (US); Chunming (Frank C.) Qi, Lexington, MA (US); Mark R. Hagan, New Haven, CT (US); Alexis Smith, Berkeley, CA (US); Lawrence Clawson, Dover, MA (US)

(73) Assignee: Nuvera Fuel Cells, Inc., Billerica, MA (US)

( * ) Notice: Subject to any disclaimer, the term of this patent is extended or adjusted under 35 U.S.C. 154(b) by 827 days.

(21) Appl. No.: 10/463,763

(22) Filed: Jun. 13, 2003

(65) Prior Publication Data

US 2004/0037758 A1    Feb. 26, 2004

Related U.S. Application Data

(60) Provisional application No. 60/388,555, filed on Jun. 13, 2002.

(51) Int. Cl.
  *B01J 8/04*   (2006.01)
(52) U.S. Cl. .................. 422/191; 422/192; 422/194; 422/211; 422/235; 48/61; 48/127.9; 48/120
(58) Field of Classification Search .............. 48/61, 48/127.9, 119, 120, 128, 129; 422/191, 192, 422/194, 211, 235; 429/17, 20
See application file for complete search history.

(56) References Cited

U.S. PATENT DOCUMENTS

| 1,366,176 | A | 1/1921 | Harger et al. |
| 1,375,932 | A | 4/1921 | Rideal et al. |
| 1,797,426 | A | 3/1931 | Larson |
| 2,051,363 | A | 8/1936 | Beekley |
| 2,220,849 | A | 11/1940 | Riblett |

(Continued)

FOREIGN PATENT DOCUMENTS

EP    0 312 757    4/1989

(Continued)

OTHER PUBLICATIONS

V.V. Wadekar, *Compact Heat Exchangers*, CEP Magazine, Dec. 2000, pp. 39-49.

*Primary Examiner*—N. Bhat
(74) *Attorney, Agent, or Firm*—Finnegan, Henderson, Farabow, Garrett & Dunner, L.L.P.

(57) ABSTRACT

According to the present invention, a temperature profile within a preferential oxidation reactor is controlled using a two phase water/steam system to provide a temperature range within the reactor (10) which favors the selective oxidation of CO in a hydrogen rich reformate stream. The reformate is flowed in a mixture with oxygen over a preferential oxidation catalyst (17). The temperature profile is controlled by flowing a stream of water proximate to the preferential oxidation catalyst (17) so as the stream of water and the reformate stream passing over the catalyst (17) are in a heat transfer arrangement. The stream of water is maintained as a two phase stream from a point at which the water reaches its boiling temperature to a point proximate an outlet from which the stream of water exits the reactor (10).

19 Claims, 15 Drawing Sheets

U.S. PATENT DOCUMENTS

| | | |
|---|---|---|
| 2,759,805 A | 8/1956 | Erickson et al. |
| 2,795,559 A | 6/1957 | Whaley |
| 3,014,787 A | 12/1961 | Peet |
| 3,069,348 A | 12/1962 | Bergstrom |
| 3,159,450 A | 12/1964 | Asker et al. |
| 3,180,813 A | 4/1965 | Wasp et al. |
| 3,216,782 A | 11/1965 | Cohn |
| 3,216,783 A | 11/1965 | Cohn |
| 3,278,452 A | 10/1966 | Vorum |
| 3,288,646 A | 11/1966 | Söredal |
| 3,334,971 A | 8/1967 | James et al. |
| 3,367,882 A | 2/1968 | Marshall, Jr. |
| 3,375,140 A | 3/1968 | Oswin |
| 3,387,942 A | 6/1968 | Habermehl et al. |
| 3,395,004 A | 7/1968 | Taylor et al. |
| 3,397,028 A | 8/1968 | Brauer |
| 3,438,759 A | 4/1969 | Linden et al. |
| 3,446,672 A | 5/1969 | Giner |
| 3,446,674 A | 5/1969 | Giner |
| 3,451,949 A | 6/1969 | Topsoe et al. |
| 3,462,308 A | 8/1969 | Winters |
| 3,477,942 A | 11/1969 | Cochran |
| 3,499,797 A | 3/1970 | Hooper |
| 3,516,807 A | 6/1970 | West et al. |
| 3,524,720 A | 8/1970 | Bauer |
| 3,531,263 A | 9/1970 | Sederquist |
| 3,541,729 A | 11/1970 | Dantowitz |
| 3,585,078 A | 6/1971 | Sederquist et al. |
| 3,607,419 A | 9/1971 | Keating, Jr. |
| 3,615,850 A | 10/1971 | Chludzinski et al. |
| 3,619,144 A | 11/1971 | Bawa et al. |
| 3,645,701 A | 2/1972 | Banchik et al. |
| 3,649,360 A | 3/1972 | Bloomfield et al. |
| 3,666,423 A | 5/1972 | Muenger |
| 3,666,682 A | 5/1972 | Muenger |
| 3,669,751 A | 6/1972 | Richman |
| 3,718,506 A | 2/1973 | Fischer et al. |
| 3,729,898 A | 5/1973 | Richardson |
| 3,731,071 A | 5/1973 | White et al. |
| 3,787,038 A | 1/1974 | Tesner et al. |
| 3,796,547 A | 3/1974 | Muenger |
| 3,909,299 A | 9/1975 | Corrigan |
| 3,920,416 A | 11/1975 | Houseman |
| 3,932,147 A | 1/1976 | Okagami et al. |
| 3,941,869 A | 3/1976 | Fuchs |
| 3,955,941 A | 5/1976 | Houseman et al. |
| 3,959,019 A | 5/1976 | Miyoshi et al. |
| 3,961,018 A | 6/1976 | Williamson |
| 3,971,847 A | 7/1976 | Houseman |
| 3,981,792 A | 9/1976 | Scott |
| 3,982,910 A | 9/1976 | Houseman et al. |
| 4,006,099 A | 2/1977 | Marion et al. |
| 4,006,100 A | 2/1977 | Crouch |
| 4,007,017 A | 2/1977 | Slater et al. |
| 4,007,018 A | 2/1977 | Slater et al. |
| 4,007,019 A | 2/1977 | Slater et al. |
| 4,008,050 A | 2/1977 | Betz |
| 4,010,797 A | 3/1977 | Parnkopf et al. |
| 4,025,612 A | 5/1977 | Barber |
| 4,042,344 A | 8/1977 | Callcott et al. |
| 4,045,960 A | 9/1977 | Cornelius et al. |
| 4,056,602 A | 11/1977 | Matovich |
| 4,059,076 A | 11/1977 | Kosaka et al. |
| 4,060,397 A | 11/1977 | Buiter et al. |
| 4,060,498 A | 11/1977 | Kawagoshi et al. |
| 4,066,543 A | 1/1978 | McCoy |
| 4,067,958 A | 1/1978 | Gorin |
| 4,071,330 A | 1/1978 | Sederquist |
| 4,072,601 A | 2/1978 | Patouillet |
| 4,073,698 A | 2/1978 | Blurton et al. |
| 4,074,981 A | 2/1978 | Slater |
| 4,083,799 A | 4/1978 | Estes et al. |
| 4,087,259 A | 5/1978 | Fujitani et al. |
| 4,088,450 A | 5/1978 | Kosaka et al. |
| 4,094,650 A | 6/1978 | Koh et al. |
| 4,094,813 A | 6/1978 | Van Lookeren Compagne |
| 4,098,587 A | 7/1978 | Krar et al. |
| 4,098,588 A | 7/1978 | Buswell et al. |
| 4,098,589 A | 7/1978 | Buswell et al. |
| 4,099,383 A | 7/1978 | Paull et al. |
| 4,101,376 A | 7/1978 | Cornelius et al. |
| 4,113,441 A | 9/1978 | Suzuki et al. |
| 4,113,445 A | 9/1978 | Gettert et al. |
| 4,121,912 A | 10/1978 | Barber et al. |
| 4,125,090 A | 11/1978 | Masunaga et al. |
| 4,140,493 A | 2/1979 | Johnson et al. |
| 4,145,405 A | 3/1979 | Gorin |
| 4,153,671 A | 5/1979 | Clements et al. |
| 4,155,987 A | 5/1979 | Peterman et al. |
| 4,162,290 A | 7/1979 | Crawford et al. |
| 4,178,758 A | 12/1979 | Paull et al. |
| 4,181,503 A | 1/1980 | Lesieur et al. |
| 4,182,795 A | 1/1980 | Baker et al. |
| 4,183,369 A | 1/1980 | Thomas |
| 4,184,322 A | 1/1980 | Paull et al. |
| 4,191,540 A | 3/1980 | Mitchell et al. |
| 4,199,545 A | 4/1980 | Matovich |
| 4,203,950 A | 5/1980 | Sederquist |
| 4,205,044 A | 5/1980 | Gramatica |
| 4,212,817 A | 7/1980 | Schmid et al. |
| 4,216,198 A | 8/1980 | Simons |
| 4,224,298 A | 9/1980 | Robinson |
| 4,229,418 A | 10/1980 | Wijffels et al. |
| 4,233,179 A | 11/1980 | Russ et al. |
| 4,233,180 A | 11/1980 | Hausberger et al. |
| 4,233,276 A | 11/1980 | D'Souza et al. |
| 4,236,941 A | 12/1980 | Main, Jr. |
| 4,240,805 A | 12/1980 | Sederquist |
| 4,242,105 A | 12/1980 | Frost |
| 4,246,235 A | 1/1981 | Rogers |
| 4,259,294 A | 3/1981 | Van Zijll Langhout et al. |
| 4,259,312 A | 3/1981 | Flockenhaus et al. |
| 4,259,414 A | 3/1981 | Williams |
| 4,261,964 A | 4/1981 | Scott, IV et al. |
| 4,277,444 A | 7/1981 | Van Landeghem |
| 4,292,274 A | 9/1981 | Faitani et al. |
| 4,293,315 A | 10/1981 | Sederquist |
| 4,328,008 A | 5/1982 | Muenger et al. |
| 4,328,856 A | 5/1982 | Cunningham |
| 4,337,170 A | 6/1982 | Fuderer |
| 4,338,292 A | 7/1982 | Duranleau |
| 4,341,737 A | 7/1982 | Albano et al. |
| 4,343,624 A | 8/1982 | Belke et al. |
| 4,353,712 A | 10/1982 | Marion et al. |
| 4,355,003 A | 10/1982 | Grobel |
| 4,365,006 A | 12/1982 | Baker |
| 4,371,379 A | 2/1983 | Brent et al. |
| 4,372,920 A | 2/1983 | Zardi |
| 4,381,187 A | 4/1983 | Sederquist |
| 4,390,347 A | 6/1983 | Dille et al. |
| 4,391,617 A | 7/1983 | Way |
| 4,391,794 A | 7/1983 | Silberring |
| 4,392,869 A | 7/1983 | Marion et al. |
| 4,402,711 A | 9/1983 | Stellaccio |
| 4,405,562 A | 9/1983 | Zardi et al. |
| 4,405,593 A | 9/1983 | Schlauer et al. |
| 4,420,462 A | 12/1983 | Clyde |
| 4,430,096 A | 2/1984 | Schnur et al. |
| 4,436,711 A | 3/1984 | Olson |
| 4,436,793 A | 3/1984 | Adlhart |
| 4,442,020 A | 4/1984 | Fuderer |
| 4,454,207 A | 6/1984 | Fraioli et al. |
| 4,462,928 A | 7/1984 | Dille et al. |
| 4,464,444 A | 8/1984 | Mikawa |

| | | | | | | |
|---|---|---|---|---|---|---|
| 4,478,793 A | 10/1984 | Vickers | | 4,830,834 A | 5/1989 | Stahl et al. |
| 4,491,456 A | 1/1985 | Schlinger | | 4,835,072 A | 5/1989 | Grasso et al. |
| 4,504,447 A | 3/1985 | Spurrier et al. | | 4,836,831 A | 6/1989 | Martens |
| 4,505,232 A | 3/1985 | Usami et al. | | 4,838,020 A | 6/1989 | Fujitsuka |
| 4,522,894 A | 6/1985 | Hwang et al. | | 4,838,897 A | 6/1989 | Amano et al. |
| 4,530,886 A | 7/1985 | Sederquist | | 4,839,247 A | 6/1989 | Levy et al. |
| 4,532,192 A | 7/1985 | Baker et al. | | 4,841,723 A | 6/1989 | Lau et al. |
| 4,537,839 A * | 8/1985 | Cameron .................... 429/20 | | 4,842,844 A | 6/1989 | Harris et al. |
| 4,553,981 A | 11/1985 | Fuderer | | 4,844,837 A | 7/1989 | Heck et al. |
| 4,563,267 A | 1/1986 | Graham et al. | | 4,847,051 A | 7/1989 | Parenti, Jr. |
| 4,569,890 A | 2/1986 | Barthel | | 4,848,387 A | 7/1989 | Hon |
| 4,578,370 A | 3/1986 | Greenwood | | 4,849,187 A | 7/1989 | Uozu et al. |
| 4,581,157 A | 4/1986 | Twigg | | 4,855,192 A | 8/1989 | Grasso |
| 4,590,044 A | 5/1986 | Mos et al. | | 4,859,545 A | 8/1989 | Scheffler et al. |
| 4,604,275 A | 8/1986 | Murib | | 4,861,347 A | 8/1989 | Szydlowski et al. |
| 4,618,451 A | 10/1986 | Gent | | 4,865,624 A | 9/1989 | Okada |
| 4,626,521 A | 12/1986 | Murib | | 4,865,926 A | 9/1989 | Levy et al. |
| 4,636,371 A | 1/1987 | Farha, Jr. | | 4,869,894 A | 9/1989 | Wang et al. |
| 4,642,042 A | 2/1987 | Smith | | 4,876,163 A | 10/1989 | Reichner |
| 4,642,272 A | 2/1987 | Sederquist | | 4,877,592 A | 10/1989 | Matros et al. |
| 4,650,651 A | 3/1987 | Fuderer | | 4,879,189 A | 11/1989 | Snopkowski |
| 4,657,828 A | 4/1987 | Tajima | | 4,888,031 A | 12/1989 | Martens |
| 4,659,634 A | 4/1987 | Struthers | | 4,888,130 A | 12/1989 | Banquy |
| 4,666,680 A | 5/1987 | Lewis | | 4,892,717 A | 1/1990 | Hass |
| 4,670,357 A | 6/1987 | Taylor | | 4,897,089 A | 1/1990 | Quang et al. |
| 4,670,359 A | 6/1987 | Beshty et al. | | 4,897,253 A | 1/1990 | Jenkins |
| 4,678,600 A | 7/1987 | Stahl et al. | | 4,902,586 A | 2/1990 | Wertheim |
| 4,678,723 A | 7/1987 | Wertheim | | 4,904,455 A | 2/1990 | Karafian et al. |
| 4,681,701 A | 7/1987 | Sie | | 4,909,808 A | 3/1990 | Voecks |
| 4,686,157 A | 8/1987 | Miyake et al. | | 4,909,809 A | 3/1990 | Ohsaki et al. |
| 4,690,690 A | 9/1987 | Andrew et al. | | 4,910,099 A | 3/1990 | Gottesfeld |
| 4,692,306 A | 9/1987 | Minet et al. | | 4,919,844 A | 4/1990 | Wang |
| 4,693,882 A | 9/1987 | Setzer et al. | | 4,921,680 A | 5/1990 | Bonk et al. |
| 4,696,871 A | 9/1987 | Pinto | | 4,923,767 A | 5/1990 | Grasso et al. |
| 4,699,631 A | 10/1987 | Marion | | 4,923,768 A | 5/1990 | Kaneko et al. |
| 4,713,303 A | 12/1987 | Farooque et al. | | 4,925,456 A | 5/1990 | Egglestone |
| 4,716,023 A | 12/1987 | Christner et al. | | 4,935,037 A | 6/1990 | Koyama et al. |
| 4,722,873 A | 2/1988 | Matsumura | | 4,943,493 A | 7/1990 | Vartanian |
| 4,729,931 A | 3/1988 | Grimble | | 4,946,750 A | 8/1990 | Nomden et al. |
| 4,737,161 A | 4/1988 | Szydlowski et al. | | 4,952,380 A | 8/1990 | Najjar et al. |
| 4,738,903 A | 4/1988 | Garow et al. | | 4,971,601 A | 11/1990 | Najjar et al. |
| 4,740,357 A | 4/1988 | Buswell et al. | | 4,973,528 A | 11/1990 | Sanderson |
| 4,741,978 A | 5/1988 | Takabayashi | | 4,973,529 A | 11/1990 | Grasso et al. |
| 4,743,517 A | 5/1988 | Cohen et al. | | 4,976,747 A | 12/1990 | Szydlowski et al. |
| 4,746,329 A | 5/1988 | Christner et al. | | 4,981,676 A | 1/1991 | Minet et al. |
| 4,751,151 A | 6/1988 | Healy et al. | | 4,985,231 A | 1/1991 | Lywood |
| 4,759,997 A | 7/1988 | Ohyauchi et al. | | 4,988,283 A | 1/1991 | Nagasawa et al. |
| 4,762,532 A | 8/1988 | Lipp | | 4,988,580 A | 1/1991 | Ohsaki et al. |
| 4,765,132 A | 8/1988 | Ahner et al. | | 4,993,368 A | 2/1991 | Jones et al. |
| 4,766,044 A | 8/1988 | Sederquist | | 4,994,331 A | 2/1991 | Cohen |
| 4,778,485 A | 10/1988 | Suggitt et al. | | 4,999,029 A | 3/1991 | Lueth et al. |
| 4,781,241 A | 11/1988 | Misage et al. | | 4,999,133 A | 3/1991 | Banquy |
| 4,781,731 A | 11/1988 | Schlinger | | 5,000,926 A | 3/1991 | Murayama et al. |
| 4,782,669 A | 11/1988 | Trocciola et al. | | 5,004,592 A | 4/1991 | Pinto |
| 4,789,384 A | 12/1988 | Martens et al. | | 5,006,131 A | 4/1991 | Karafian et al. |
| 4,789,540 A | 12/1988 | Jenkins | | 5,009,967 A | 4/1991 | Scheffler |
| 4,791,033 A | 12/1988 | Patel | | 5,011,625 A | 4/1991 | Le Blanc |
| 4,792,436 A | 12/1988 | Tsai | | 5,011,670 A | 4/1991 | Davis et al. |
| 4,792,502 A | 12/1988 | Trocciola et al. | | 5,013,617 A | 5/1991 | Scheffler |
| 4,800,138 A | 1/1989 | Romanowski et al. | | 5,019,356 A | 5/1991 | Silberring |
| 4,801,356 A | 1/1989 | Grasso | | 5,019,463 A | 5/1991 | Matsubara et al. |
| 4,804,580 A | 2/1989 | Singelyn | | 5,023,151 A | 6/1991 | Landau et al. |
| 4,804,591 A | 2/1989 | Grasso et al. | | 5,026,536 A | 6/1991 | Shioiri et al. |
| 4,810,485 A | 3/1989 | Marianowski et al. | | 5,030,440 A | 7/1991 | Lywood et al. |
| 4,816,040 A | 3/1989 | Bonville et al. | | 5,030,661 A | 7/1991 | Lywood |
| 4,816,353 A | 3/1989 | Wertheim et al. | | 5,032,365 A | 7/1991 | Aono et al. |
| 4,820,594 A | 4/1989 | Sugita et al. | | 5,034,287 A | 7/1991 | Kunz |
| 4,822,521 A | 4/1989 | Fuderer | | 5,035,867 A | 7/1991 | Dang Vu et al. |
| 4,824,738 A | 4/1989 | Misage et al. | | 5,039,510 A | 8/1991 | Pinto |
| 4,824,740 A | 4/1989 | Abrams et al. | | 5,043,232 A | 8/1991 | Landau et al. |
| 4,826,742 A | 5/1989 | Reiser | | 5,045,297 A | 9/1991 | Bonifaz et al. |
| 4,828,940 A | 5/1989 | Cohen et al. | | 5,045,414 A | 9/1991 | Bushnell et al. |
| 4,830,091 A | 5/1989 | Dierke et al. | | 5,047,299 A | 9/1991 | Shockling |

| | | | | | |
|---|---|---|---|---|---|
| 5,051,244 A | 9/1991 | Dunne et al. | 5,366,820 A | 11/1994 | Tsutsumi et al. |
| 5,059,494 A | 10/1991 | Vartanian et al. | 5,366,821 A | 11/1994 | Merritt et al. |
| 5,064,732 A | 11/1991 | Meyer | 5,380,600 A | 1/1995 | Hansen et al. |
| 5,064,733 A | 11/1991 | Krist et al. | 5,382,271 A | 1/1995 | Ng et al. |
| 5,071,719 A | 12/1991 | Rostrup-Nielsen et al. | 5,401,589 A | 3/1995 | Palmer et al. |
| 5,079,105 A | 1/1992 | Bossel | 5,419,978 A | 5/1995 | Landau |
| 5,080,875 A | 1/1992 | Bernauer | 5,421,840 A | 6/1995 | Taylor et al. |
| 5,084,363 A | 1/1992 | Reiser | RE35,002 E | 7/1995 | Matsubara et al. |
| 5,087,271 A | 2/1992 | Stellaccio et al. | 5,429,809 A | 7/1995 | Stahl et al. |
| 5,092,121 A | 3/1992 | Ahner et al. | 5,432,021 A | 7/1995 | Wilkinson et al. |
| 5,093,178 A | 3/1992 | Sundstrom et al. | 5,436,086 A | 7/1995 | Seymour et al. |
| 5,096,470 A | 3/1992 | Krishnamurthy | 5,437,123 A | 8/1995 | Greiner et al. |
| 5,096,674 A | 3/1992 | Shingai | 5,441,546 A | 8/1995 | Moard et al. |
| 5,098,690 A | 3/1992 | Koves | 5,441,819 A | 8/1995 | Voss et al. |
| 5,106,390 A | 4/1992 | Beierle et al. | 5,441,821 A | 8/1995 | Merritt et al. |
| 5,106,590 A | 4/1992 | Hopper et al. | 5,447,702 A | 9/1995 | Campbell et al. |
| 5,110,559 A | 5/1992 | Kondo et al. | 5,451,249 A | 9/1995 | Spiegel et al. |
| 5,112,578 A | 5/1992 | Murayama et al. | 5,456,889 A | 10/1995 | Pow et al. |
| 5,122,299 A | 6/1992 | LeBlanc | 5,458,808 A | 10/1995 | Suggitt et al. |
| 5,132,174 A | 7/1992 | Romanowski et al. | 5,458,857 A | 10/1995 | Collins et al. |
| 5,141,823 A | 8/1992 | Wright et al. | 5,461,864 A | 10/1995 | Betta et al. |
| 5,143,800 A | 9/1992 | George et al. | 5,462,358 A | 10/1995 | Werner |
| 5,149,600 A | 9/1992 | Yamase et al. | 5,462,719 A | 10/1995 | Pedersen et al. |
| 5,152,975 A | 10/1992 | Fong et al. | 5,464,606 A | 11/1995 | Buswell et al. |
| 5,156,821 A | 10/1992 | Murayama | 5,470,360 A | 11/1995 | Sederquist |
| 5,156,926 A | 10/1992 | Lemoine | 5,470,670 A | 11/1995 | Yasumoto et al. |
| 5,164,163 A | 11/1992 | Aoki et al. | 5,470,671 A | 11/1995 | Fletcher et al. |
| 5,169,730 A | 12/1992 | Reichner et al. | 5,472,986 A | 12/1995 | van Dijk |
| 5,181,937 A | 1/1993 | Karafian et al. | 5,482,680 A | 1/1996 | Wilkinson et al. |
| 5,193,635 A | 3/1993 | Mizuno et al. | 5,484,576 A | 1/1996 | Langer et al. |
| 5,198,310 A | 3/1993 | Fleming et al. | 5,484,577 A | 1/1996 | Buswell et al. |
| 5,199,961 A | 4/1993 | Ohsaki et al. | 5,486,313 A | 1/1996 | De Jong et al. |
| 5,200,278 A | 4/1993 | Watkins et al. | 5,492,682 A | 2/1996 | Succi et al. |
| 5,202,195 A | 4/1993 | Stedman et al. | 5,496,531 A | 3/1996 | Davis et al. |
| 5,207,185 A | 5/1993 | Greiner et al. | 5,503,944 A | 4/1996 | Meyer et al. |
| 5,209,908 A | 5/1993 | Koves et al. | 5,510,056 A | 4/1996 | Jacobs et al. |
| 5,213,912 A | 5/1993 | Kunz et al. | 5,510,201 A | 4/1996 | Werth |
| 5,221,586 A | 6/1993 | Morimoto et al. | 5,516,344 A | 5/1996 | Corrigan |
| 5,226,928 A | 7/1993 | Makabe et al. | 5,518,827 A | 5/1996 | Matsumura et al. |
| 5,229,102 A | 7/1993 | Minet et al. | 5,520,891 A | 5/1996 | Lee |
| 5,229,222 A | 7/1993 | Tsutsumi et al. | 5,527,631 A | 6/1996 | Singh et al. |
| 5,229,345 A | 7/1993 | Logothetis et al. | 5,527,632 A | 6/1996 | Gardner |
| 5,235,846 A | 8/1993 | Fanciullo | 5,529,484 A | 6/1996 | Moard et al. |
| 5,242,673 A | 9/1993 | Flytzani-Stephanopoulos et al. | 5,538,706 A | 7/1996 | Kapoor et al. |
| 5,245,110 A | 9/1993 | Van Dijk et al. | 5,543,532 A | 8/1996 | Kourtakis et al. |
| 5,248,566 A | 9/1993 | Kumar et al. | 5,546,701 A | 8/1996 | Greiner et al. |
| 5,248,567 A | 9/1993 | Amemiya et al. | 5,547,776 A | 8/1996 | Fletcher et al. |
| 5,250,270 A | 10/1993 | Noe | 5,554,347 A | 9/1996 | Busson et al. |
| 5,260,143 A | 11/1993 | Voss et al. | 5,554,351 A | 9/1996 | Primdahl |
| 5,260,640 A | 11/1993 | Carabetta et al. | 5,560,890 A | 10/1996 | Berman et al. |
| 5,265,635 A | 11/1993 | Giammatteo et al. | 5,560,891 A | 10/1996 | Takashima et al. |
| 5,271,916 A | 12/1993 | Vanderborgh et al. | 5,565,009 A | 10/1996 | Ruhl et al. |
| 5,275,632 A | 1/1994 | Corrigan | 5,567,397 A | 10/1996 | Le Gal et al. |
| 5,290,641 A | 3/1994 | Harashima | 5,567,398 A | 10/1996 | Ruhl et al. |
| 5,299,536 A | 4/1994 | Moard et al. | 5,573,866 A | 11/1996 | Van Dine et al. |
| 5,300,275 A | 4/1994 | Lywood | 5,578,093 A | 11/1996 | Campbell et al. |
| 5,302,470 A | 4/1994 | Okada et al. | 5,588,974 A | 12/1996 | Tiller et al. |
| 5,308,456 A | 5/1994 | Kunz et al. | 5,593,640 A | 1/1997 | Long et al. |
| 5,316,747 A | 5/1994 | Pow et al. | 5,604,047 A | 2/1997 | Bellows et al. |
| 5,326,550 A | 7/1994 | Adris et al. | 5,609,834 A | 3/1997 | Hamada et al. |
| 5,330,727 A | 7/1994 | Trocciola et al. | 5,612,012 A | 3/1997 | Soma et al. |
| 5,330,857 A | 7/1994 | Sederquist et al. | 5,618,322 A | 4/1997 | Mizuno et al. |
| 5,335,628 A | 8/1994 | Dunbar | 5,628,931 A | 5/1997 | Lednor et al. |
| 5,340,663 A | 8/1994 | Buswell et al. | 5,637,415 A | 6/1997 | Melster et al. |
| 5,341,313 A | 8/1994 | Parrott et al. | 5,639,401 A | 6/1997 | Jacobs et al. |
| 5,344,721 A | 9/1994 | Sonai et al. | 5,639,431 A | 6/1997 | Shirasaki et al. |
| 5,346,778 A | 9/1994 | Ewan et al. | 5,643,692 A | 7/1997 | Ohmi |
| 5,346,779 A | 9/1994 | Nakazawa | 5,645,950 A | 7/1997 | Benz et al. |
| 5,360,679 A | 11/1994 | Buswell et al. | 5,646,852 A | 7/1997 | Lorenz et al. |
| 5,362,453 A | 11/1994 | Marsch | 5,648,051 A | 7/1997 | Trimble et al. |
| 5,366,704 A | 11/1994 | Koves et al. | 5,648,182 A | 7/1997 | Hara et al. |
| 5,366,818 A | 11/1994 | Wilkinson et al. | 5,651,800 A | 7/1997 | Mizuno et al. |
| 5,366,819 A | 11/1994 | Hartvigsen et al. | 5,669,960 A | 9/1997 | Couche |

| | | |
|---|---|---|
| 5,676,911 A | 10/1997 | Baumert et al. |
| 5,700,595 A | 12/1997 | Reiser |
| 5,705,138 A | 1/1998 | Le Gal et al. |
| 5,707,917 A | 1/1998 | Geus et al. |
| 5,712,052 A | 1/1998 | Kawaatsu |
| 5,716,587 A | 2/1998 | Khanmamedov |
| 5,718,881 A | 2/1998 | Sederquist et al. |
| 5,728,183 A | 3/1998 | Greiner et al. |
| 5,730,763 A | 3/1998 | Manulescu et al. |
| 5,733,347 A | 3/1998 | Lesieur |
| 5,733,675 A | 3/1998 | Dederer et al. |
| 5,733,941 A | 3/1998 | Waycuilis |
| 5,741,440 A | 4/1998 | Cooper et al. |
| 5,741,474 A | 4/1998 | Isomura et al. |
| 5,746,985 A | 5/1998 | Takahashi |
| 5,750,076 A | 5/1998 | Buswell et al. |
| 5,763,114 A | 6/1998 | Khandkar et al. |
| 5,763,765 A | 6/1998 | Lamont et al. |
| 5,769,909 A | 6/1998 | Bonk et al. |
| 5,771,476 A | 6/1998 | Mufford et al. |
| 5,792,572 A | 8/1998 | Foley et al. |
| 5,800,792 A | 9/1998 | Ibaraki et al. |
| 5,823,761 A | 10/1998 | Euzen et al. |
| 5,840,270 A | 11/1998 | Werth |
| 5,840,437 A | 11/1998 | Diethelm |
| 5,843,195 A | 12/1998 | Aoyama |
| 5,858,314 A | 1/1999 | Hsu et al. |
| 5,861,137 A | 1/1999 | Edlund |
| 5,869,011 A | 2/1999 | Lee |
| 5,874,051 A | 2/1999 | Heil et al. |
| RE36,148 E | 3/1999 | Strasser |
| 5,876,469 A | 3/1999 | Moriya et al. |
| 5,897,970 A | 4/1999 | Isomura et al. |
| 5,904,907 A | 5/1999 | Shih |
| 5,914,091 A | 6/1999 | Holst et al. |
| 5,916,529 A | 6/1999 | Scheuerman |
| 5,925,322 A | 7/1999 | Werth |
| 5,931,658 A | 8/1999 | Sederquist et al. |
| 5,935,531 A | 8/1999 | Giacobbe |
| 5,938,800 A | 8/1999 | Verrill et al. |
| 5,939,031 A | 8/1999 | Ellis et al. |
| 5,942,197 A | 8/1999 | Gupta et al. |
| 5,942,203 A | 8/1999 | Van Dijk et al. |
| 6,156,184 A | 12/2000 | Antonucci et al. |
| 6,238,815 B1 * | 5/2001 | Skala et al. .................. 429/17 |
| 6,403,049 B1 | 6/2002 | Van Keulen et al. |
| 6,447,745 B1 * | 9/2002 | Feeley et al. ............. 423/648.1 |
| 6,485,853 B1 | 11/2002 | Pettit et al. |
| 6,641,625 B1 * | 11/2003 | Clawson et al. ............ 48/127.9 |
| 7,066,973 B1 * | 6/2006 | Bentley et al. ............ 48/197 R |
| 7,069,981 B2 * | 7/2006 | Valensa et al. ............... 165/164 |

FOREIGN PATENT DOCUMENTS

| | | |
|---|---|---|
| EP | 0 361 648 | 4/1990 |
| EP | 0 600 621 A1 | 6/1994 |
| EP | 0 112 613 | 7/1994 |
| GB | 1060166 | 1/1967 |
| GB | 1 408 560 | 10/1975 |
| GB | 2084894 A | 4/1982 |
| GB | 2179366 A | 3/1987 |
| GB | 2268322 A | 1/1994 |
| JP | 06211501 | 8/1994 |
| WO | WO 97/44123 | 11/1997 |
| WO | WO 98/08771 | 3/1998 |

* cited by examiner

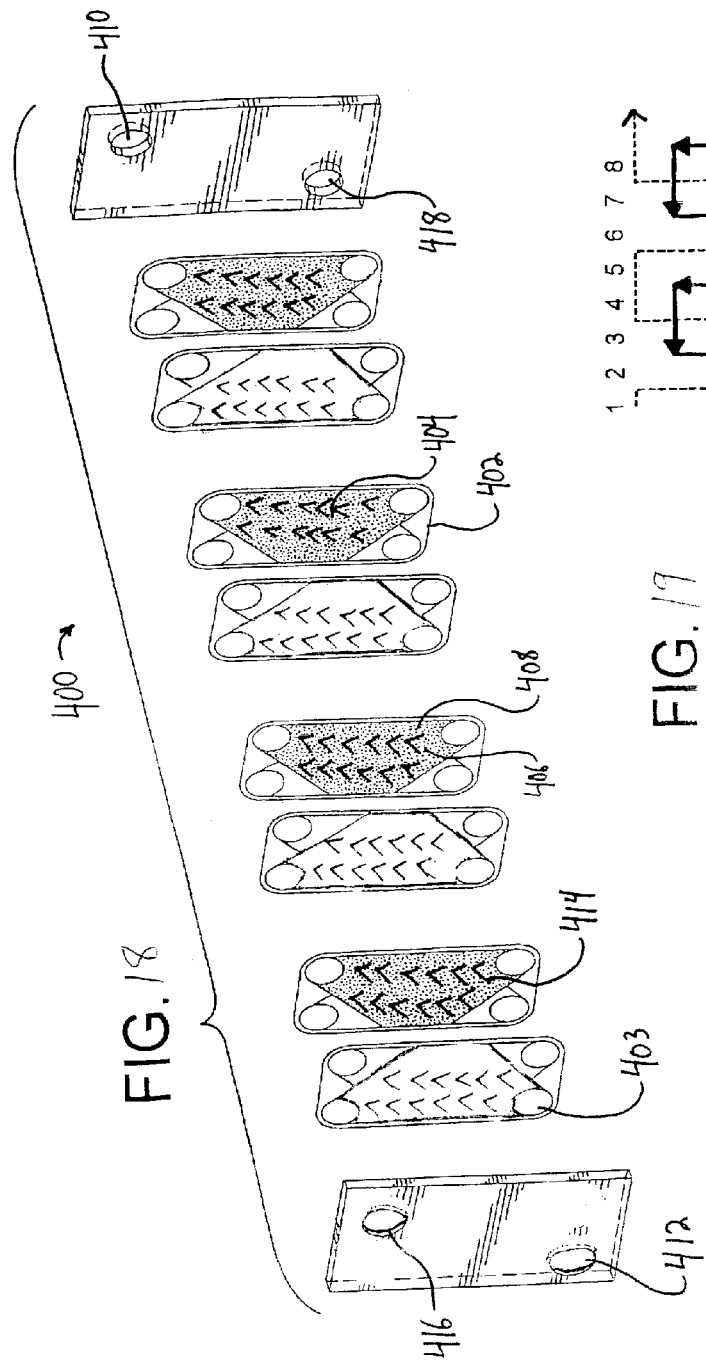
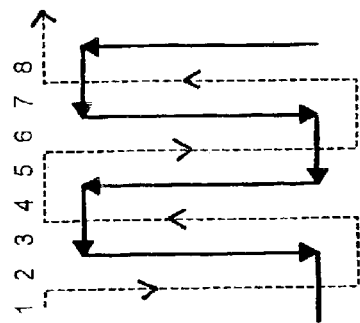
FIG. 17
FIG. 18

PREFERENTIAL OXIDATION REACTOR TEMPERATURE REGULATION

RELATED APPLICATIONS

The present invention claims priority of U.S. Provisional Patent Application 60/388,555 filed Jun. 13, 2002 and U.S. patent application Ser. No. 09/562,787 filed May 2, 2000 which claims priority of U.S. Provisional Patent Applications 60/132,184 and 60,132,259, both filed May 3, 1999.

TECHNICAL FIELD

The present invention is generally related to a hydrocarbon fuel reforming system for reforming a gaseous or liquid hydrocarbon fuel to produce a hydrogen-rich product stream for use in, among other things, fuel cells. More particularly, the invention is directed to a method and apparatus for selective or preferential oxidation of carbon monoxide, and particularly in the control of reactor temperature during this process.

BACKGROUND OF THE INVENTION

Reforming of hydrocarbon fuels to make hydrogen is well known in the art. In a first stage, hydrocarbons are reacted with steam to make a mixture of hydrogen, carbon monoxide and other components, commonly referred to as the reformate, sometimes also referred to as syngas, particularly before a water-gas shift reaction is performed. In a second stage, known as the water-gas shift reaction, the reformate is treated with additional steam to convert most of the carbon monoxide to carbon dioxide and produce additional hydrogen. However, the shift reaction is an equilibrium reaction, and typically does not reduce the carbon monoxide content of the reformate to a level suitable for supplying to a PEM fuel cell. For a PEM fuel cell, it is necessary to further remove carbon monoxide from the hydrogen-rich reformate stream. It is known to further reduce the carbon monoxide content of hydrogen-rich reformate exiting a shift reactor by a so-called preferential oxidation ("PrOx") reaction (also known as "selective oxidation") effected in a suitable PrOx reactor. A PrOx reactor usually comprises a catalyst that promotes the selective oxidation of carbon monoxide to carbon dioxide by oxygen in the presence of the hydrogen, without oxidizing substantial quantities of the hydrogen itself. The preferential oxidation reaction is:

$$CO + \tfrac{1}{2}O_2 \rightarrow CO_2 \qquad (1)$$

Desirably, the amount of $O_2$ used for the PrOx reaction will be no more than about two times the stoichiometric amount required to react the CO in the reformate. If the amount of $O_2$ exceeds about two to three times the stoichiometric amount needed, excessive consumption of $H_2$ results. On the other hand, if the amount of $O_2$ is substantially less than about two times the stoichiometric amount needed, insufficient CO oxidation may occur, making the reformate unsuitable for use in a PEM fuel cell. The essence of the PrOx process is described in the literature, for example, in U.S. Pat. Nos. 1,366,176 and 1,375,932. Modern practice is described, for example, in, "Preferential Oxidation of CO over Pt/γ-$Al_2O_3$ and Au/α-$Fe_2O_3$: Reactor Design Calculations and Experimental Results" by M. J. Kahlich, et al. published in the *Journal of New Materials for Electrochemical Systems,* 1988 (pp. 39-46), and in U.S. Pat. No. 5,316,747 to Pow et al.

A wide variety of catalysts for promoting the PrOx reaction are known. Some are disclosed in the above references. In modern practice, such catalysts are often provided by commercial catalyst vendors, and their compositions are typically proprietary. The practitioner is instead provided with approximate temperature ranges for use, and some physical parameters. The properties of candidate catalysts have to be evaluated in the actual proposed design before final selection of a catalyst for development or production. Moreover, catalysts come in a wide variety of physical forms. In addition to the "classical" pellets and powders, which are typically porous to some extent, catalysts are also supplied on any of a large variety of supports. These may also be pellets, but also include monoliths, such as the ceramic and metal honeycombs used in automotive catalytic converters, metal and ceramic foams, and other monolithic forms.

PrOx reactions may be either (1) adiabatic (i.e., where the temperature of the reformate and the catalyst are allowed to rise during oxidation of the CO), or (2) isothermal (i.e., where the temperature of the reformate and the catalyst are maintained substantially constant during oxidation of the CO). The adiabatic PrOx process is typically effected via a number of sequential stages which progressively reduce the CO content. Temperature control is important at all stages, because if the temperature rises too much, methanation, hydrogen oxidation, or a reverse shift reaction can occur. The reverse shift reaction produces more undesirable CO, while methanation and hydrogen oxidation decrease system efficiencies.

The selectivity of the catalyst of the preferential oxidation reaction is dependent on temperature, typically decreasing in selectivity as the temperature rises. The activity of the catalyst is also temperature dependent, increasing with higher temperatures. Furthermore, the reaction is very slow below a threshold temperature. For this reason the temperature profile in a PrOx reactor is important in maximizing the oxidation of carbon monoxide while minimizing the undesired oxidation of the hydrogen gas in the mixed gas stream.

More particularly, when the PrOx catalyst temperature is less than a certain value, high levels of CO may bind to the catalytic site but fail to react, thereby inhibiting the catalyst's performance. When PrOx temperature increases beyond a certain point, catalyst selectivity decreases, and a higher equilibrium CO concentration results. Because of these multiple sensitivities of the reaction to temperature, there is for any catalyst a preferred temperature range for efficient operation. Moreover, to minimize catalyst volume, it is often desirable to perform a first step of the preferential oxidation at a higher temperature, for speed of reaction, and a final cleanup at a lower temperature, for selectivity and for minimum reverse shift.

The need for temperature control adds numerous complexities to the system. For example, multiple air lines, air distributors, air flow controllers, and reactor vessels, as disclosed, for example, in U.S. Pat. No. 5,874,051, add size and manufacturing cost to the reactor, and further highlight the need for a compact, efficient reactor design. Compactness, simplicity, and efficiency are particularly important in small scale PrOx reactors suitable for use in mobile and domestic-scale systems.

The present invention addresses the above problems and challenges, and provides other advantages, as will be understood by those in the art, in view of the following specification and claims.

SUMMARY OF THE INVENTION

According to one aspect of the invention, a method of controlling a temperature profile within a preferential oxidation reactor to provide a temperature range within the reactor which favors the selective oxidation of CO in a hydrogen rich reformate stream by a preferential oxidation catalyst is provided. It includes flowing a stream of a mixture of a hydrogen rich reformate and oxygen over the preferential oxidation catalyst. A stream of water is flowed proximate to the preferential oxidation catalyst so as the stream of water and the reformate stream passing over the catalyst are in a heat transfer arrangement. The stream of water is maintained as a two phase stream from a point at which the water reaches its boiling temperature to a point proximate an outlet from which the stream of water exits the reactor.

According to another aspect of the invention, a reactor for the selective oxidation of carbon monoxide in a hydrogen rich reformate stream includes a reactor body. The reactor has an inlet for the addition of a reformate stream to the reactor body. The reactor also includes at least one oxygen inlet for the addition of oxygen to the reformate stream. A catalyst suitable for selective oxidation of carbon monoxide is located within the reactor body. The reactor includes a heat exchanger, having an inlet and an outlet, for removing heat from at least one of the catalyst and the reformate. A stream of water flows through the heat exchanger. The stream of water enters the heat exchanger at least partially as liquid water and is a two phase mixture of water and steam throughout at least a portion of the reformate flow path.

According to another aspect of the invention, a reactor for the selective oxidation of carbon monoxide in a hydrogen rich reformate stream includes a reactor body. The body includes an inlet for the addition of a reformate stream to the reactor body. The reactor has at least one inlet for the addition of oxygen to the reformate stream. A substrate, wash coated with a catalyst suitable for selective oxidation of carbon monoxide is contained within the reactor body and the substrate is a heat exchanger through which a coolant flows.

According to another aspect of the invention, a heat exchanger includes two or more tubular sections each with an inlet and an outlet for permitting circulation of a heat exchange fluid through the tubular section. The heat exchanger has a connector between each tubular section for permitting a flow from the outlet of one tubular section to the inlet of the next tubular section.

According to another aspect of the invention, the operation of PrOx reactors in purifying reformate, especially in small or mobile systems, can be improved by particular improvements in management of the temperature profile in the PrOx reactor. These improvements include operating the reactor in a substantially isothermal mode by using the particular properties of two-phase cooling water, i.e., water/steam mixtures, to maintain the temperature of the heat-removal system close to the boiling point of water at a particular pressure. Moreover, the pressure may be adjusted by a pressure regulator to place the boiling temperature at a favorable point in the temperature profile of the particular catalyst used in the PrOx reaction. Additional improvements include use of an initial non-catalytic heat-exchange section within the reactor to allow cooling of the reformate before beginning the preferential oxidation reaction. Furthermore, adjustment of water flow rate can provide a significant final section of the reactor at a reduced temperature to provide a final cleanup stage at slow kinetics but favorable selectivity of the catalyst. In achieving these improvements, it is preferable, but not required, to use catalysts deposited onto or incorporated into monolithic structures, because of the improved heat exchange that this can provide, as well as for preventing catalyst attrition during operation. In these improvements, it is preferable in most situations to have the coolant pass through the reactor counter the direction of flow of the reformate being treated. However, when the resulting CO concentration is sufficiently low for the intended use because the initial concentration was low or the final end use does not require an extremely low CO concentration, concurrent flow can be advantageous in shortening the bed length by elimination of most of the cooler region of the reactor which has higher selectivity.

These and other aspects of the present invention set forth in the appended claims may be realized in accordance with the following disclosure with particular reference to the accompanying drawings.

BRIEF DESCRIPTION OF THE DRAWINGS

The following descriptions of the present invention are discussed with particular reference to the appended drawings of which:

FIG. 18 is an exploded view of a PrOx reactor according to another embodiment of the present invention; and FIG. 19 is a schematic view of fluid flow through the reactor of FIG. 18.

DETAILED DESCRIPTION OF PREFERRED EMBODIMENTS

Figure 1:
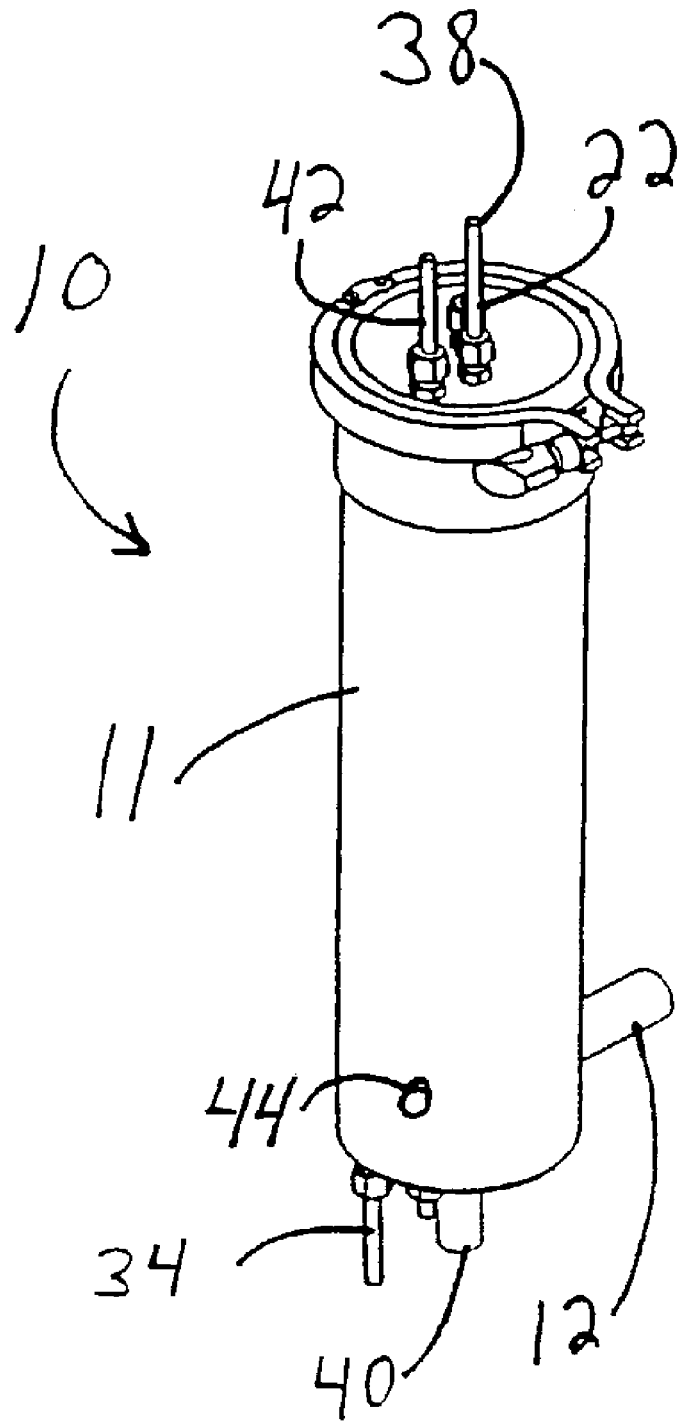
FIG. 1 is a perspective view of a PrOx reactor according to one embodiment of the present invention.

While the invention is susceptible of embodiment in many different forms, there is shown in the drawings and will herein be described in detail preferred embodiments of the invention. It is to be understood that the present disclosure is to be considered as an exemplification of the principles of the invention. This disclosure is not intended to limit the broad aspect of the invention to the illustrated embodiments.

In appreciating the significance of the improvements described herein, it should be recalled throughout that the temperature of the PrOx reactor catalyst is preferably maintained above a lower level, and below a maximum level so that the selectivity for carbon monoxide oxidation over hydrogen oxidation is maintained. At the same time, the volume of the catalyst bed should be as small as possible, and the system should have as few parts as possible for ease of manufacturing. The PrOx reactors of the present invention incorporate and embody improvements with respect to balancing these conflicting requirements.

Figure 2:
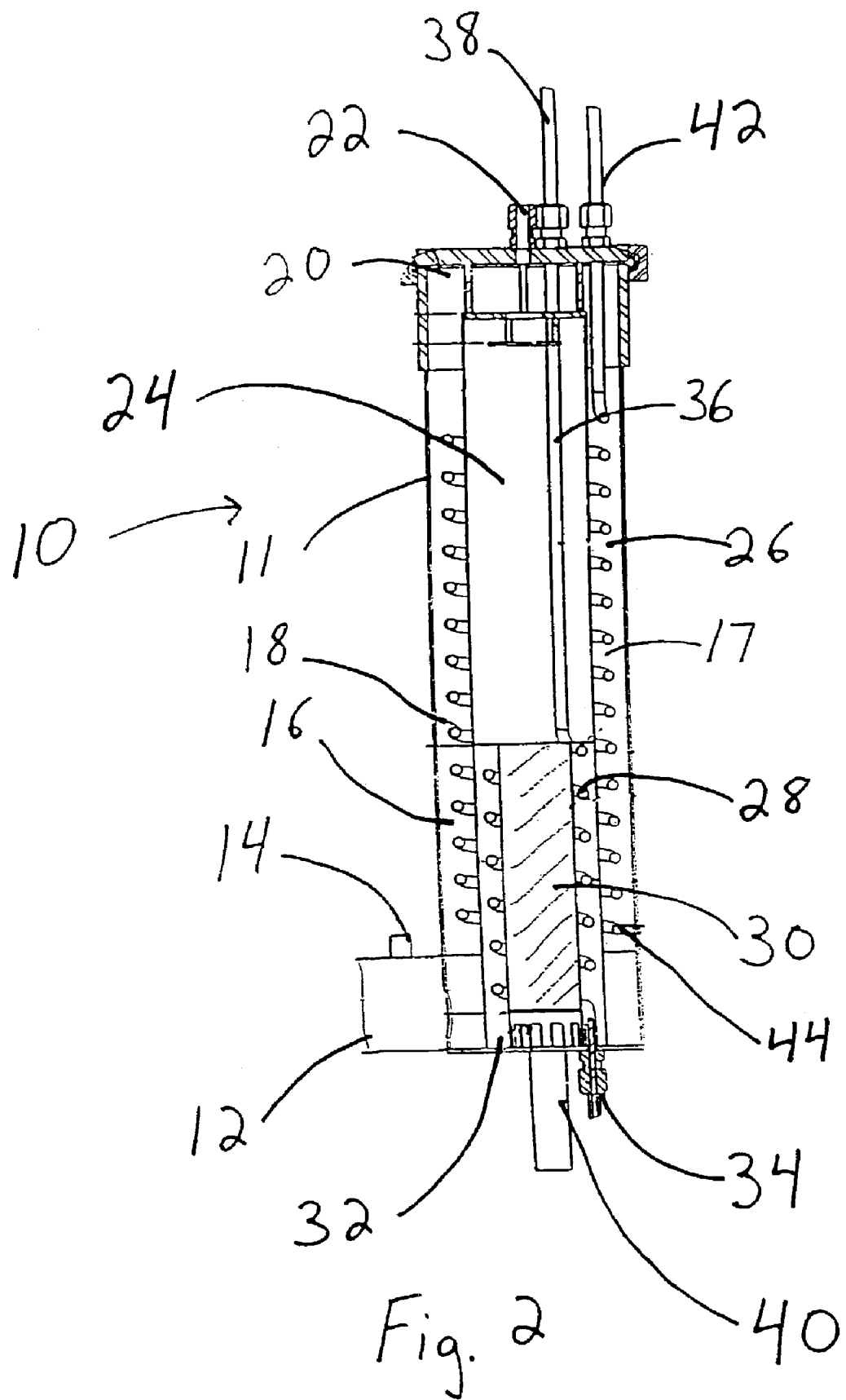
FIG. 2 is a cross sectional view of the PrOx reactor of FIG. 1 according to one embodiment of the present invention.

FIGS. 1 and 2 show a first embodiment of the present invention. The reactor 10 is shown in perspective in FIG. 1, and in cross section in FIG. 2. The reactor 10 includes a reactor body 11. A reformate inlet 12 has an air inlet 14, through which an oxygen-containing gas (either pure oxygen, or oxygen mixed with other gases, such as in air) is mixed with the reformate prior to entering the reactor 10. Alternatively, in other embodiments, the air inlet is directed into the reactor wherein oxygen is mixed with the reformate stream at a location inside the reactor body 11. Oxygen and air are generally used as synonyms herein, except in discussing particular chemical reactions. The rate of flow of the oxygen is usually controlled, and the flow may be adjusted to maintain a desired ratio between the amount of carbon monoxide entering the reactor 10 and the amount of oxygen. The desired ratio is approximately two oxygen atoms (i.e., one diatomic oxygen molecule) per carbon monoxide molecule. The reformate and oxygen mixture enters the reactor 10 and flows into a catalyst bed 17. The catalyst bed 17 is optionally, and preferably, preceded by a non-catalytic cooling bed 16 optimized for temperature equilibration of the reformate. In the design of FIGS. 1 and 2, the cooling bed 16 is preferably filled with heat-conducting material, such as metal shot, to optimize heat exchange, and the catalyst bed 17 is typically granular. Other physical forms are contemplated, examples of which are discussed below.

The catalyst used may be any of those known in the art which are suitable for the selective oxidation of carbon monoxide, examples of which include $Pt/\gamma-Al_2O_3$ and $Au/\alpha Fe_2O_3$. A wide variety of catalysts for promoting the PrOx reaction are known. Such catalysts are easily available from commercial catalyst vendors, and their compositions are typically proprietary. The approximate temperatures ranges for use, and the physical parameters of the catalyst used may be any of those commonly used in the art. The properties of candidate catalysts have to be evaluated in the actual proposed design before final selection of a catalyst for development or production. Moreover, catalysts come in a wide variety of physical forms. In addition to classical porous pellets and powders, catalysts on any of a large variety of supports are suitable for use. These may be pellets, but also include monoliths, such as the ceramic and metal honeycombs use in automotive catalytic converters, metal and ceramic foams, and other monolithic forms, such as catalyst coated on tubes of a heat exchanger, as described below. The catalysts may be coated onto the supports, or impregnated into them, or may comprise extruded or otherwise formed catalyst-containing materials. Any of these catalyst chemistries and forms is potentially suitable for catalyzing the PrOx reaction.

In this embodiment, the reformate flowing through the catalyst bed 17 undergoes an exothermic preferential oxidation reaction in which carbon monoxide is selectively oxidized. In order to maintain a temperature that favors this reaction, a cooling tube 18 may be embedded in the catalyst bed 17 and in the non-catalytic cooling bed 16. Depending upon the catalyst used, a favorable temperature for the PrOx reaction falls within the range of from about 75° C. to about 300° C. More preferably the temperature range should be from about 100° C. to about 250° C. In one embodiment, a two phase water/steam cooling medium is routed through the cooling tube 18 in a direction countercurrent to the direction of flow of the reformate. Two phases are not necessarily present throughout the entire length of cooling tube 18, but are present in at least a portion of the cooling tube 18 as it passes through the beds 16 and 17. Water is typically fed to the reactor 10 in a substantially single phase liquid form and is then at least partially vaporized by heat absorbed as it passes through cooling tube 18 within the reactor body 11, creating a two phase system. The point at which the water is initially heated to its boiling point varies depending on the operating conditions of the reactor 10. The point within the cooling tube 18 at which it reaches its boiling point may vary substantially without affecting the carbon monoxide concentration present in the reformate exit stream from the reactor 10.

The two phase system is advantageous in that it allows the removal of heat from the exothermic selective oxidation reaction without an increase in the temperature of the cooling medium. Rather, the heat removed from the catalyst bed 17 performs work in the form of a vaporization phase change. In this way, the reactor 10 is able to deal with transitory power demands caused by, for example, an increased need for hydrogen at a fuel cell (not shown) without the catalyst bed 17 temperature rising to a point at which it does not operate effectively in the selective oxidation of carbon monoxide. To the extent that the water in the cooling tube 18 is allowed to completely vaporize, the steam within the cooling tube will become superheated to the temperature of the reformate, and not operate effectively to reduce the temperature of the reformate. In order to maintain a two phase system within the cooling tube 18, the flow of water through the cooling tube 18 is adjusted as needed to maintain some liquid water throughout most or all of cooling tube 18.

Controlling the pressure within the cooling tube 18 may additionally be used to maintain the temperature of the two phase system (by adjusting the boiling point of water). Water is inlet to the cooling tube 18 through inlet 42 and outlet at 44. The exiting stream of water/steam exits the reactor 10 and is then optionally integrated into the larger fuel processing system of which the PrOx reactor 10 is a part. The steam may be directed to a steam separator, an auxiliary heater, a heat exchanger, or a steam reformer located separately from the PrOx reactor. In this manner the efficiency of the system is maximized by using heat generated in the exothermic selective oxidation reaction in other areas of the fuel processing system requiring the addition of heat or steam. It should be noted that if the water is entirely evaporated in the final portion of its flow path through the reactor, such as in cooling bed 16, the temperature control desired can still be obtained.

Referring to FIG. 2, upon exiting the catalyst bed 17, the reformate mixture flows into a manifold 20 where it is optionally and preferably mixed with a second addition of oxygen from air inlet 22. The amount of oxygen added through inlet 22 is generally in the range of from about 10% to about 30%, or sub-ranges therein, preferably about 20%, of the initial amount added through inlet 14. The mixture flows into catalyst bed 24 located annularly interior to gap 26 which contains the first catalyst bed 17, and through which the first cooling tube 18 is routed. The catalyst 24 may be any of the well known PrOx catalysts as discussed above. Here the mixture again undergoes the exothermic selective oxidation reaction. The reaction is preferably allowed to proceed adiabatically in catalyst bed 24. The now CO-depleted mixture flows out of catalyst bed 24, through a second set of cooling coils 28 which are optionally surrounded by additional PrOx catalyst or additional steel shot. The cooling coils 28 are coiled around a cylindrical central region 30. The central region 30 is blocked off, and may be hollow, contain insulation, or may have additional reforming equipment contained therein. After passing through catalyst bed 24, the reformate flows into manifold 32 where it is directed out of the reactor through outlet 40.

Cool water enters the second set of coils 28 through inlet 34. It travels through the cooling coils 28, travels through a riser 36, and exits the reactor 10 through outlet 38. Outlet 38 is optionally and preferably connected to water inlet 42. In traversing the reactor 10, the water of the cooling coils 28 is preferentially heated from an inlet temperature in the range of from about 20° C. to 60° C. to an outlet temperature of about 90° C. to about 120° C. This part of the coolant flow is substantially a single phase liquid. The water exiting from outlet 38 is optionally recycled to the inlet 42 of the higher temperature section. However, a fresh feed of water to inlet 42 may be used in addition, or in place of the water from outlet 38.

In addition to adjusting the temperature of the reformate to be suitable for use with the particular catalyst, the temperature may also be regulated to prevent condensation of water from the reformate onto the catalysts. Alternatively, the moisture content of the reformate can be reduced, for example by provision of a condenser, or by adjustment of the steam to carbon ratio, to prevent condensation in the beds.

Figure 3:
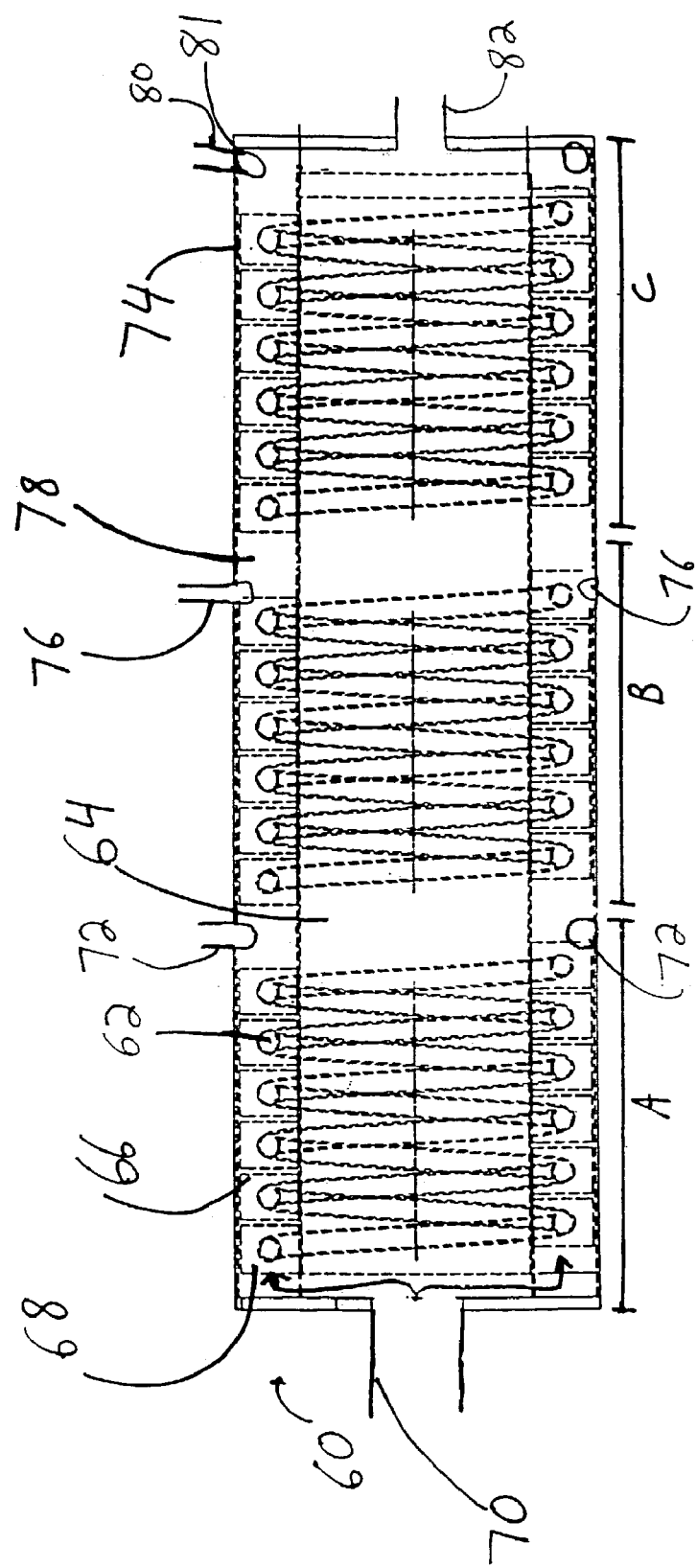
FIG. 3 is cross sectional view of a PrOx reactor according to another embodiment of the present invention.

FIG. 3 shows another embodiment of the present invention wherein the PrOx reactor 60 includes the use of a two phase water cooling system. The water/steam is contained within a helical tube 62. Here, the helical tube 62 coils around a central core 64 that is a hollow space contained within a sealed chamber.

In other embodiments, core 64 may contain an insulating material, a heat exchanger, or another reforming reactor module for preparation of a hydrocarbon fuel for use in a PEM fuel cell. In one embodiment, the reforming reactor module includes a Low Temperature Shift (LTS) module located in core 64. A LTS module is preferred in that it is temperature compatible with a PrOx reactor, and additionally, the reformate can easily be routed directly from the LTS module to an inlet of a PrOx reactor.

The reactor has a reformate inlet 70 to which is supplied reformate having a temperature typically within the range of from about 250° C. to about 350° C. The helical tube 62 is typically constructed of copper or stainless steel. The helical tube 62 is surrounded by fins 66 creating a first tube/fin assembly 68. Additional tube/fin assemblies may be provided. The fins 66 are preferably constructed of a corrosion resistant material capable of withstanding the operating temperatures of the system. The preferred shapes for the fins 66 are square or rectangular, although other shapes could easily be substituted. The number of fins 66 in this embodiment is sixteen per inch, although a lesser or greater number could be substituted as desired depending on the details of system design. The fins 66 are preferably affixed to the tube/fin assembly 68. This may be done by silver soldering, nickel brazing, or press fitting the fins onto the tubes, with or without flanges or washers, to affix the fins 66 in place. The tube/fin assembly 68 may be treated to prevent corrosion, for example, by plating with nickel or other corrosion-resistant material.

Any or all of the fins and tubing may be wash-coated with a PrOx catalyst. As discussed above, many suitable catalysts exist for performing the PrOx reaction. It is preferred that a catalyst which displays optimal activity and selectivity for reacting CO without substantially reacting hydrogen throughout the operating temperature range is selected. A typical catalyst is a group VIII metal, or sometimes a Group VIB or VIIB metal, usually with selectivity promoters based on non-noble metals or metal oxides.

In this embodiment, the helical tube 62 and the fins 66 are contained between a cylindrical outer tube 74 and cylindrical inner core 64 which are concentrically arranged. Moving axially down the passage 78 formed between the outer tube 74 and inner core 64, the reactor of this embodiment contains three sections, A, B, and C. Reformate and oxygen enter section A through inlet 70, where they are cooled by passing over the helical tube 62 which contains two phase water/steam. The temperature of the reformate is lowered to be in the range of from about 100° C. to about 200° C. Section A of the reactor 60 does not include catalyst. Passing through section A lowers the temperature of the reformate to a temperature more favorable for the selective oxidation reaction.

The tube/fin assembly 68 within section B of the reactor 60 is wash coated with a selective oxidation catalyst. The wash-coating embodiment of this embodiment is preferred in many cases, especially mobile applications, because it is more durable and resistant to attrition than pellets. Moreover, the catalyst will operate at a temperature very close to that of the coolant, improving control of reaction temperatures. However, other physical forms of the catalyst may also be used, particularly catalyst-coated foams or monoliths, or even pellets in stationary applications.

Figure 4:
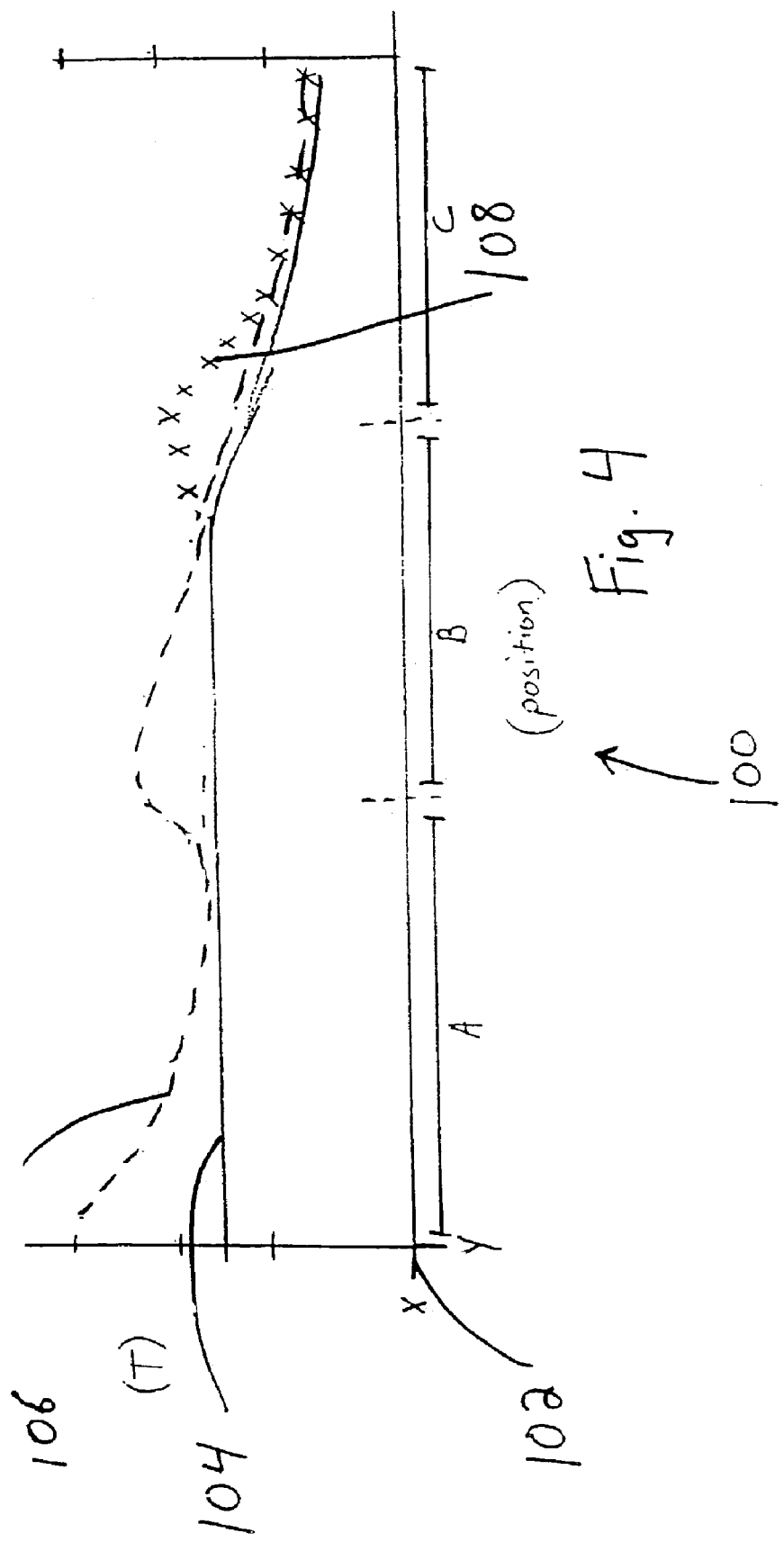
FIG. 4 is a qualitative plot of the temperature profile within the PrOx reactor of FIG. 3 according to another embodiment of the present invention.

The reformate undergoes the exothermic selective oxidation reaction in section B and raises the temperature of the reformate as indicated qualitatively by dashed line 106 of FIG. 4. Sections A, B, and C of the reactor 60 of FIG. 3 correspond to sections A, B, and C of FIG. 4. Helical tube 62 absorbs heat, and within the tube 62 water is vaporized to steam. The temperature of the helical tube 62 (and of the enclosing fins 66) remains substantially constant where the two phase system is maintained. The boiling point of the water is dependent on pressure, and the temperature of the steam/water mixture is maintained at the boiling temperature as long as the two phases are present. The operating pressure within the helical tube 62 is generally maintained in the range of from about 1 atmosphere to about 10 atmospheres. The pressure within the tube remains essentially constant and is controlled by an external pressure regulating device, such as a variable speed or pressure pump, a regulator valve, an orifice, or functionally similar known devices. Preferably, the cooling water is maintained as a one phase liquid, or a two phase liquid/vapor system substantially throughout at least sections B and C of the reactor 60.

Additional air may be added at inlet 76, and further selective oxidation of the reformate occurs in section C of the reactor 60. The amount of air added through injector 76 is typically 10 to 30% of the total air introduced to the system, more preferably, about 20%. Air injectors preferably inject the air through tubes having a plurality of holes facing in a direction countercurrent to the flow of reformate to improve mixing. Mixing may be enhanced if required throughout the reactor by the provision of mixing chambers, turbulence-creating devices, diffusing beds, and other known means. The specific location of the air inlets is different for other embodiments. Also, more or less additions may be present in a reactor. The temperature of the reformate increases upon the selective oxidation caused by the second addition of oxygen as indicated qualitatively by line 108. In other embodiments, no additional air is added, and the temperature of the reformate continues to decrease as it moves through the reactor with the temperature profile shown qualitatively by line 106. While FIG. 3 shows a reactor having two air inlets, other embodiments may include more or less than two air inlets, or may include air bleeds. A final air bleed may be provided through inlet 80 and injector of distributor 81, proximate to the outlet 82. This air is conveyed to a fuel cell downstream from a PrOx, where it oxidizes any CO adsorbed to the fuel cell membrane catalysts.

The total amount of oxygen added to the system is controlled by a single controller (not shown) in response to the level of CO predicted by a system map of the reformer, or a measured value. In those embodiments having multiple oxygen feeds, the oxygen can be drawn from a common source and distributed among the various feeds as a proportion of the whole. This may be done with calibrated orifices, delivering a fixed fraction of the total oxygen supply to each air inlet; or with valves or other equivalent methods well known in the art.

The rate of water fed to the helical tube 62 is controlled to maintain a water/steam two phase system through at least reactor 60 sections C and a substantial portion of B. In this way, the boiling temperature of water, at the system pressure of the water, controls the temperature profile of the principal reaction portion of the PrOx catalyst, and of the reformate flowing over it, so as to maintain the temperature in the optimal operating range of the particular catalyst being used. While the flow rate is adjusted as needed, it is generally possible to maintain the flow rate at a constant level through a wide range of operating conditions, including varying system demands. The presence of two phase water makes the system resilient to transient power demands. The point within the helical tube 62 at which the system becomes a two phase system may vary substantially throughout the length of the reactor 60, particularly within sections A and B, with little effect on the final level of CO in the reformate, as long as at least part of the length contains the two phase water/steam mixture. The operating temperature of the reactor varies with position within the reactor. FIG. 4 is a schematic plot 100 showing qualitatively how the temperature within the reactor 60 changes with position. The cooling water/steam temperature within the helical tube 62 is indicated by the solid line 104. The plotted embodiment assumes section A contains two-phase water, with no significant length of the tube 62 containing pure steam. The reformate (gas-phase) temperature is qualitatively indicated by the dashed line 106. The rise in line 106 at the beginning of section B is caused by the beginning of oxidation of the CO by the added oxygen. Line 108 shows the qualitative temperature profile where the reactor 60 is receiving an oxygen injection through inlet 76. Line 106 shows the temperature profile where there is only a single addition of oxygen to the reactor 60. The temperature profile of the reformate as it flows through the reactor is the same whether there are two oxygen additions up to the point of the second addition. Therefore, the temperature profile of both up to the point of the second addition, if present, is indicated by line 106.

Figure 5:
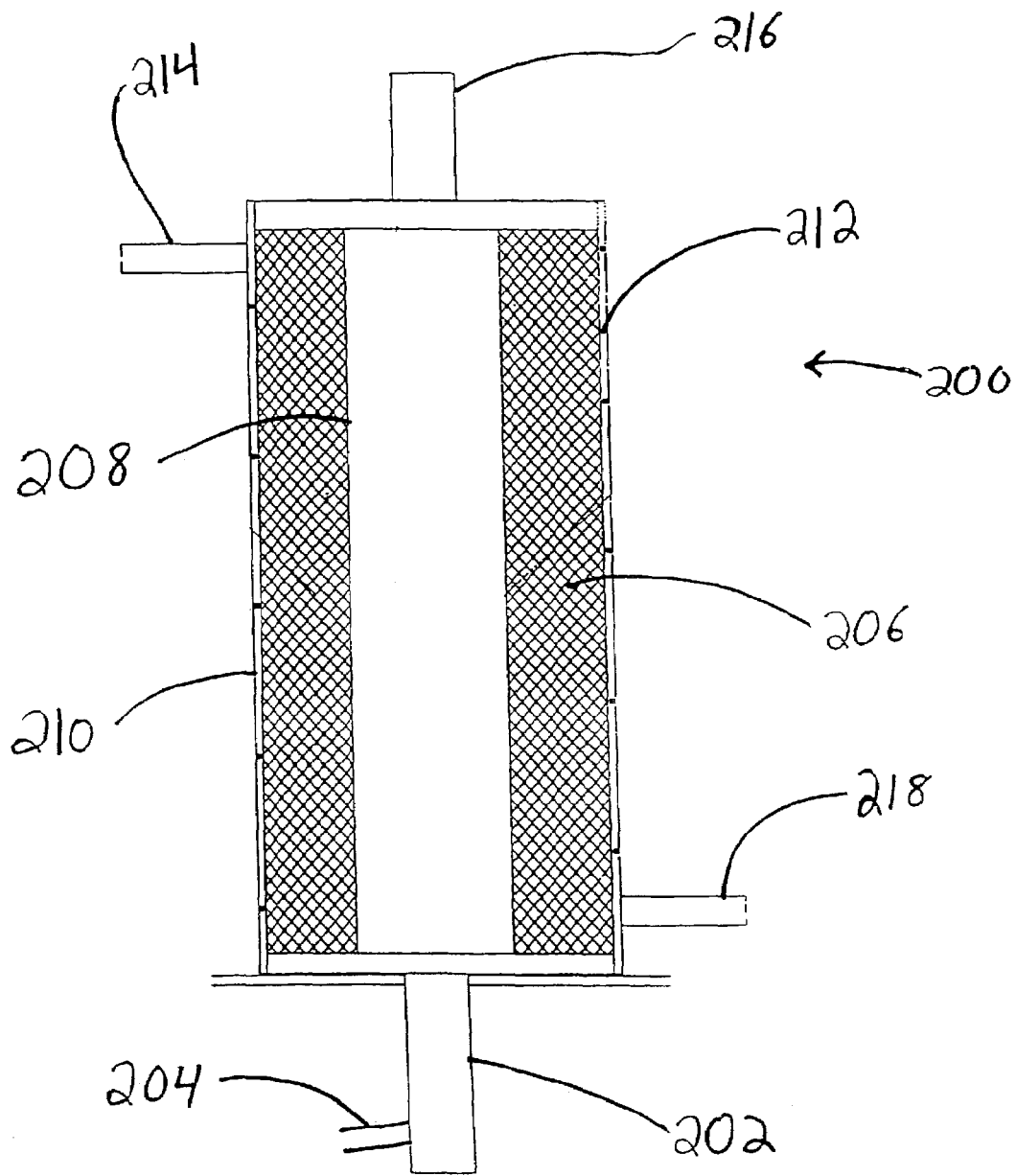
FIG. 5 is a cross sectional view of a PrOx reactor according to another embodiment of the present invention.

FIG. 5 shows another embodiment of a PrOx reactor 200. Reformate enters the reactor through a first inlet 202. The reformate preferably enters the reactor after being cooled to a temperature in the range of from about 60° C. to about 130° C., more preferably in the range of from about 70° C. to about 90° C. Cooling of the reformate prior to feeding to the reactor 200 precipitates out water vapor from the reformate stream, preventing the condensation of water from the reformate in the PrOx reactor or the PEM fuel cell. Other embodiments employ a water removal system (not shown) to remove water that may condense prior to entry, within the reactor, or between the reactor and a fuel cell stack.

Oxygen is added to the reformate through air inlet 204. The air is added at ambient temperature. In other embodiments, the air is added separately to a reactor and mixed with the reformate therein. Within the reactor 200, the reformate/air mixture flows over a catalyst bed 206. Here, the catalyst supported on a monolith or foam, typically reticulated, to provide better radial and axial heat transfer in comparison to a packed bed. In passing through the catalyst 206, the CO present is selectively oxidized to carbon dioxide. Preferably, the amount of CO present is reduced to a level in which the reformate is suitable for use with a PEM fuel cell.

The catalyst 206 of the reactor 200 is distributed annularly about a core 208 within the reactor. A core may be hollow, contain insulation, be solid, or may contain another unit used in the processing of a hydrocarbon. The core 208 occupies the center of the reactor 200, and the catalyst bed is positioned radially outward beginning at the outer edge of the core 208, and extending towards the outer wall 210 of the reactor. The reactor 200 is jacketed with a cooling water jacket 212 positioned within the outer wall 210. In other embodiments, the jacketing is not contained within a reactor wall, but either internal or external to the wall. The core 208 results in the selective oxidation reaction occurring generally closer to the cooling jacket 212, in contrast to a reactor not containing core region 208, and results in a more even temperature profile in a radial direction at each point throughout the catalyst bed 206. In other words, the temperature in the catalyst bed 206 at any point having axially the same position, and radially a different position is closer to equal than without the use of the core 208.

Water enters the water jacket 212 through inlet 214. The temperature of the water is preferably in the range of from about 1° C. to about 70° C. In traversing the jacket 212, a portion of the water becomes heated to a temperature wherein it vaporizes to steam creating a two phase system. The pressure within the jacket 212 is preferably maintained in the range of from about 1 to about 10 atmospheres. Therefore, the boiling temperature of the water in the jacket may be at temperatures of about 100° C. to about 200° C., depending on the pressure in the jacket. Use of the two phase water system has the advantage of allowing the temperature of the jacket 212 to remain substantially constant when the pressure is substantially constant, while still absorbing heat which is in turn used to vaporize liquid water. By supplying the water at a rate and temperature sufficient to ensure two phases throughout a portion of the reactor 200, control is exercised over the temperature within the catalyst 206. The reformate travels through the catalyst 206 and exits the reactor 200 through reformate outlet 216. The water/steam of the jacket 212 exits the reactor through outlet 218

Figure 6:
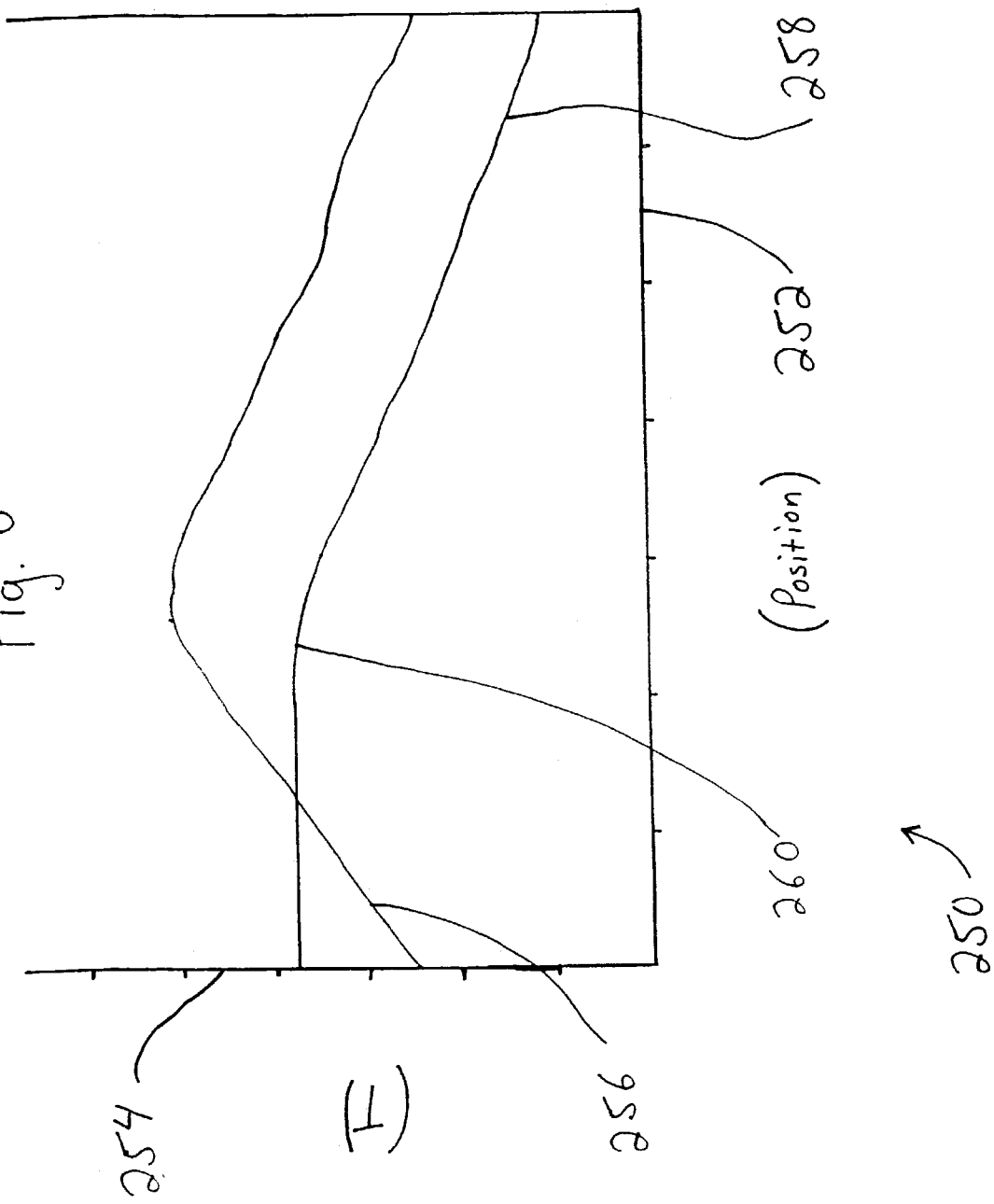
FIG. 6 is a qualitative plot of the temperature profile within the PrOx reactor of FIG. 5 according to another embodiment of the present invention.

FIG. 6 shows a graph 250 which charts the temperature profile obtained in the operation of a reactor according to the embodiment shown in FIG. 5. The horizontal axis 252 indicates position within the reactor, and the vertical access 254 qualitatively indicates the temperature. Reformate temperature is indicated by line 256, where the left hand side is the entry temperature, and the right hand side the exiting temperature. Cooling water flows countercurrent to the reformate stream, and enters on the right and exits on the left according to line 258. The two phase vaporization of the cooling water occurs near or at point 260. The temperature of the two phase system stops increasing at that point.

The PrOx reactor 200 of this example is especially suitable when the concentration of CO in the reformate has previously been reduced by a first PrOx reactor, for example one integrated with a reformer, so that the reactor 200 is performing essentially a final cleanup function. It is also particularly suited to use with a fuel cell stack operating at a temperature above that typically used in a PEM fuel cell which is about 70° C. to about 85° C. Such a fuel cell stack may operate at temperature at from about 90° C. to about 150° C., which has become possible with the use of high-temperature tolerant PEM membranes and/or membrane electrode assemblies.

Figure 7:
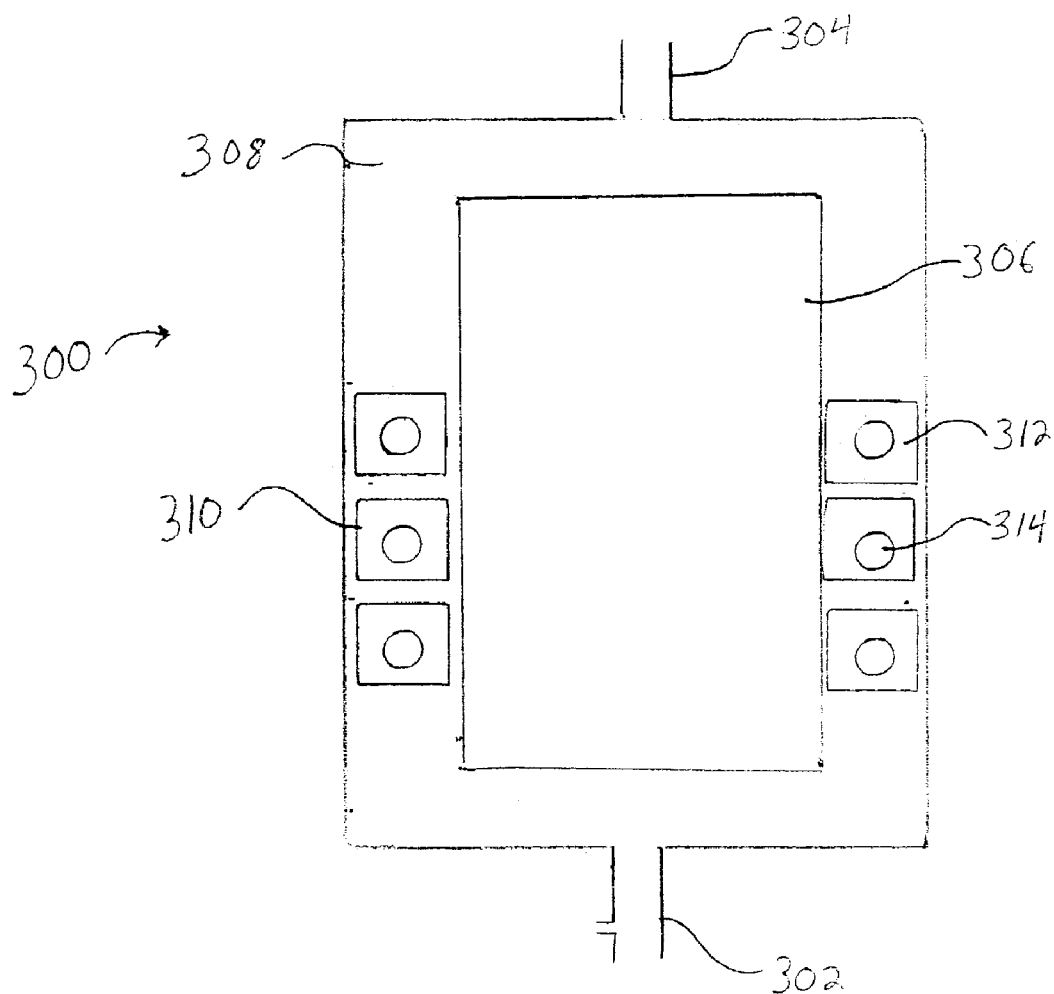
FIG. 7 is a cross-sectional view of a PrOx reactor according to another embodiment of the present invention.

FIG. 7 shows another embodiment of a PrOx reactor according to the present invention shown generally as reference numeral 300. The reactor 300 preferably includes a reformate inlet 302 and a reformate outlet 304. The reactor 300 preferably includes a core 306 positioned within the reactor body 308 such that reformate fed into the reactor through the reformate inlet 302 travels about the core 306 in traversing the reactor 300 to the reformate outlet 304. Air may be mixed with the reformate within the reformate inlet 302 prior to entry into the reactor body 308. However, other embodiments may have air inlets positioned such that air may be injected into the reactor body in place of, or in addition to the air added into the reformate inlet 302.

The reformate generally flows around the core 306 and over a heat exchanger 310 positioned within the reactor body 308. The heat exchanger will now be described in greater detail in conjunction with FIGS. 8-16.

Figure 8:
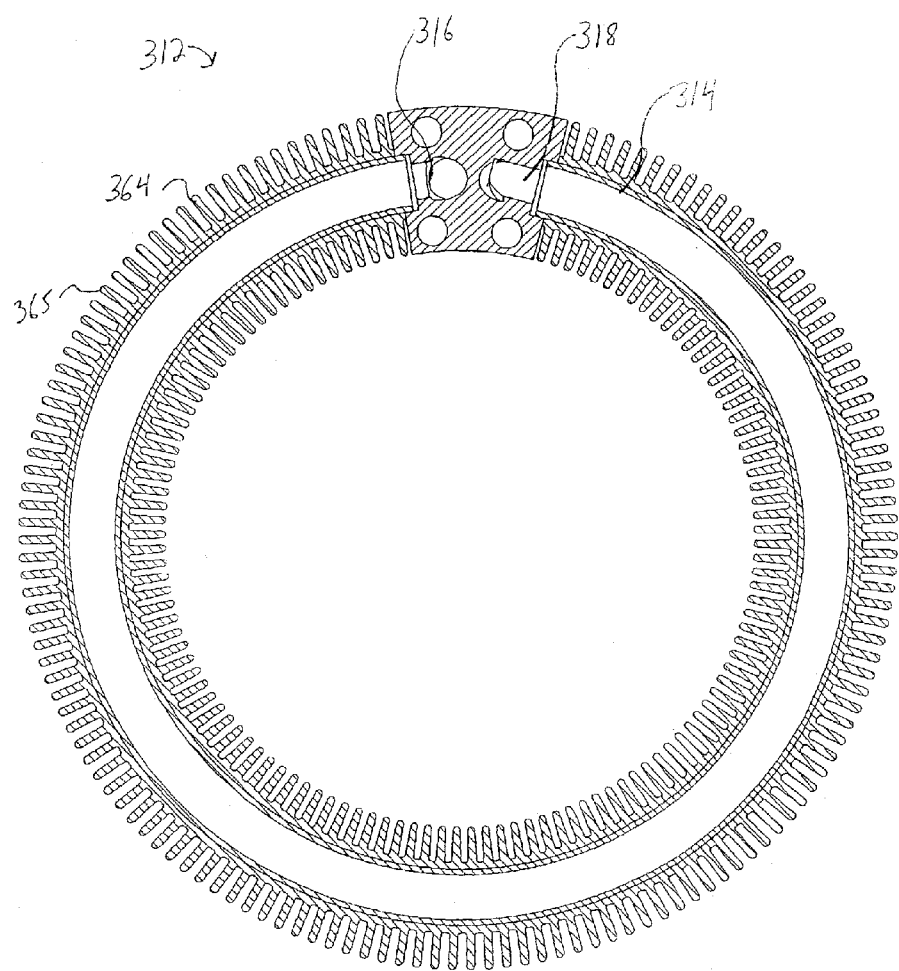
FIG. 8 is a cross-sectional view of a heat exchanger component according to another embodiment of the present invention.
Figure 9:
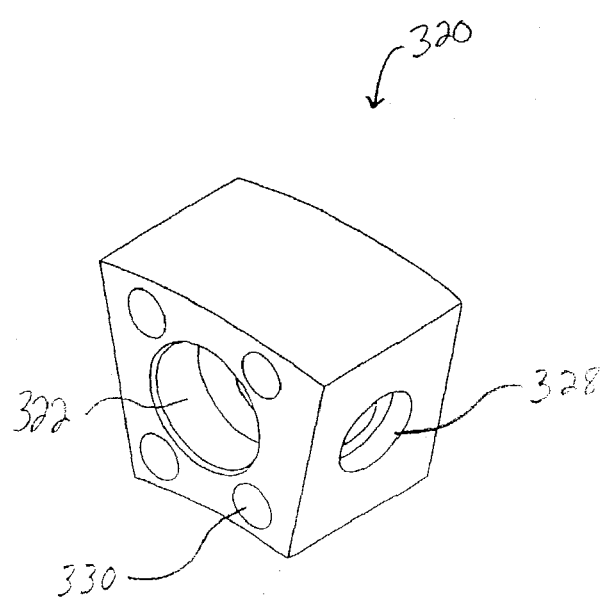
FIG. 9 is a perspective view of a heat exchanger component according to another embodiment of the present invention.

The heat exchanger 310 is generally comprised of a plurality of modular rings 312. A cross-sectional view of a single modular ring 312 is shown in FIG. 8. Each ring 312 generally includes a tubular section which here is a flow tube 314. The flow tube 314 generally has a circular shape, but the shape is not limited, and could include such shapes as oblong, obround, triangular, polygonal, or numerous other shapes with the same beneficial results. Each ring 312 generally includes an inlet 316 and an outlet 318 for permitting circulation of a heat exchange fluid. The preferred heat exchange fluid in this embodiment is water or a water and steam mixture. However, numerous heat exchange fluids could be flowed through the flow tube 314. Stainless steel is the preferred material for forming the flow tube 314. Benefits of stainless steel include its resistance to corrosion and its ability to withstand heat and pressure.

The heat exchanger generally includes a connector between each tubular section, or flow tube 314 for permitting flow from the outlet 318 of one to the inlet 316 of another. The connector preferably includes a manifold 320. Each modular ring 312 generally includes a single manifold 320 which directs fluid flow into, out of, and within each modular ring 312. The manifold 320 is shown separately in FIGS. 9-11. The manifold 320 generally includes a section transfer inlet 322 and a section transfer outlet 324 which form a fluid inlet and fluid outlet into the modular ring 312. The manifold 320 also generally include a manifold inlet 326 and a manifold outlet 328 into which the flow tube 314 is preferably secured with fluid tight seals.

Generally, a plurality of modular rings 312 are connected to one another. The manifolds 320 of the modular rings 312 generally include bolt holes 330 which extend through the manifold for securing one manifold to another. When the manifolds are joined together, a seal is generally placed between the manifolds to ensure a fluid tight seal.

Figure 12:
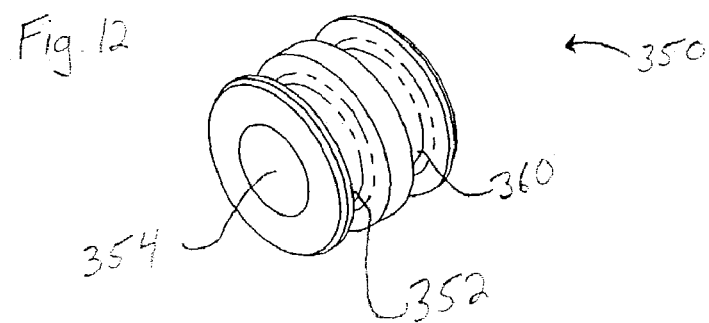
FIG. 12 is a perspective view of a heat exchanger component according to another embodiment of the present invention.
Figure 13:
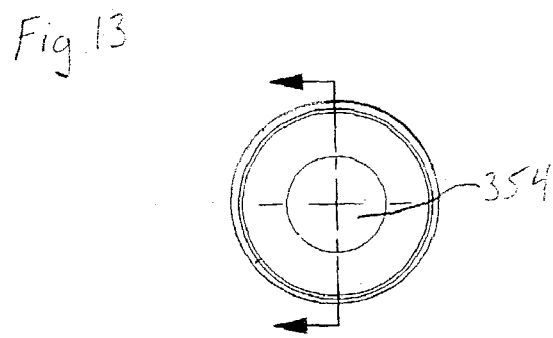
FIG. 13 is a top view of a heat exchanger component according to another embodiment of the present invention.
Figure 14:
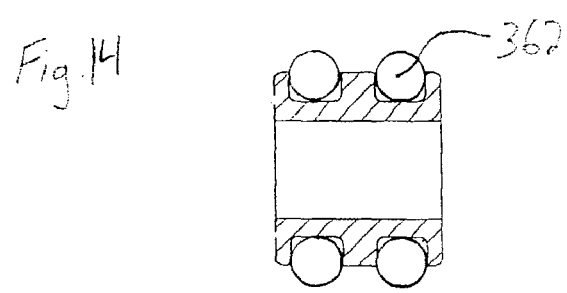
FIG. 14 is a cross-sectional view of the heat exchanger component of FIG. 13 along line 14.

FIGS. 12-14 show a preferred spool seal, shown generally as reference numeral 350. The spool seal 350 generally includes a generally cylindrical body 352 having a bore 354 through its center. The spool seal 350 generally includes an annular central ridge 356 and annular terminal ridges 358 proximate to both ends of the cylindrical body 352. The central ridge 356 and terminal ridges 358 form annular channels 360 between them. O-rings 362 are generally placed into the channels 360.

Other types of seals which are already known and in the relevant prior art may be used to form a fluid tight seal between connected manifolds. Some of these may include various gaskets, O-rings, swage, compression fittings, and numerous other types of seals which are well known to those practicing the art.

Figure 11:
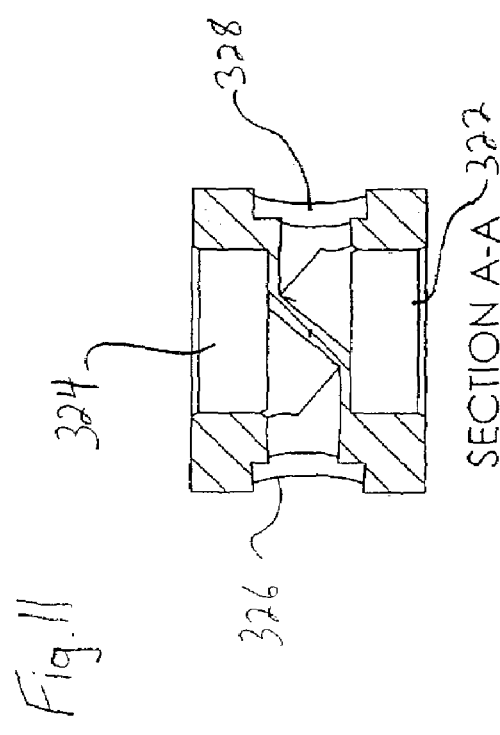
FIG. 11 is a cross-sectional view of the heat exchanger component of FIG. 10 along line 11.
Figure 10:
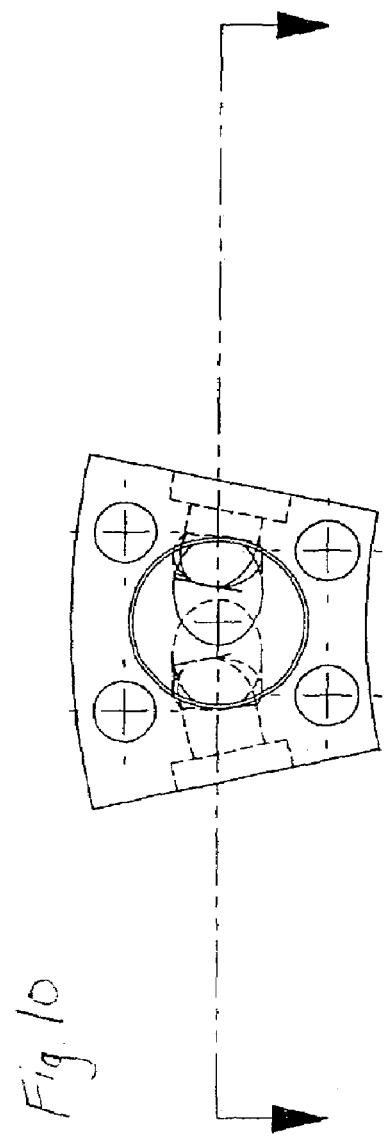
FIG. 10 is a front view of the heat exchanger component of FIG. 9.

During use, the spool seal 350 is loaded with O-rings, and inserted into the section transfer inlet 322 of the manifold 320. The spool seal 350 is inserted such that the bore 354 aligns with the section transfer inlet 322 to allow fluid flow through the bore 354. One half of the spool seal 350 is generally inserted into the section transfer inlet 322 and one half extends outward for insertion into a section transfer outlet of another manifold 324. The correct positioning of the spool seal 350 is generally governed by stops 323 within the manifold 320 as shown in FIG. 11. Once the manifolds 320 are properly aligned with spool seal 350 connections, bolts (not shown) are generally put through the aligned bolt holes 330 which extend through the manifolds 320, and tightened.

The connection between the modular rings 312 is preferably made with bolts or other nonpermanent means such that the modular rings 312 can later be unconnected without destroying the ring or its component parts. However, swaging, welding, or other permanent means for connecting the modular rings 312 may be done if additional strength is desired.

Each manifold 320 of the heat exchanger is preferably sized, configured, and attached to the adjacent manifolds such that the joined manifolds 320 provide sufficient structural rigidity to transport or operate the heat exchanger with reduced support for the joined tubular sections. The manifolds 320 may be used to join together modular rings 312 of different sizes. For example if the reactor 300 were larger through one section, a modular ring 312 having a relatively larger diameter could be used. Each of the flow tubes 314 has a flow path of from its inlet to its outlet of a defined flow path length, and two different flow tubes 314, connected by a manifold, may have differing flow path lengths.

The flow tubes 314 of the heat exchanger 310 are spaced and generally provide fluid flow within the various flow tubes 314 along respective planes substantially parallel to each other. The manifolds 350 provide fluid flow in a direction angular to the planes of flow in the flow tubes 314. The angular direction of flow through the manifolds 350 is approximately ninety degrees with respect to the flow in the flow tubes 314.

The modular rings 312 of the heat exchanger 310 generally include fins 364. The fins 364 are preferably cast aluminum. More specifically, the fin is preferably cast from a material having a high thermal conductivity such as aluminum Alloy 360. The flow tube 312 generally has an inner surface 366 and an outer surface 368. The fins 364 are generally connected to and extending out of the outer surface 368.

Figure 15:
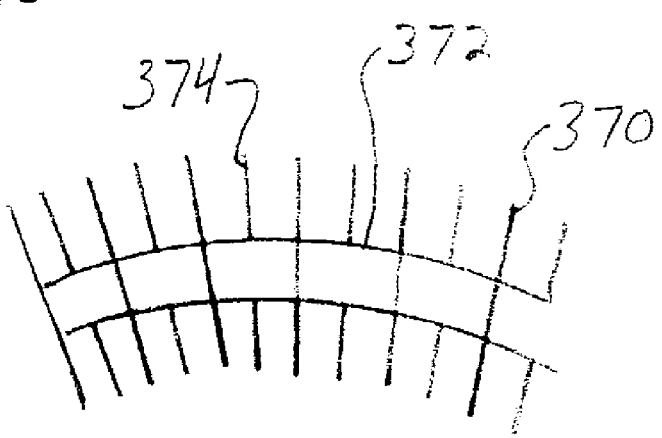
FIG. 15 is top view of a portion of a heat exchanger according to another embodiment of the present invention.

The heat exchanger 310 preferably includes a plurality of connected modular rings 312 and the fins 364 of adjacent modular rings 312 are preferable offset such that they create more turbulent flow for any fluid flowing over the heat exchanger. The fins 364 are preferably axially misaligned between each modular ring 312. FIG. 15 shows a view of two stacked modular rings 312. The fins 370 from the top modular ring are visible over the flow tube 372. The fins 374 from the bottom modular ring are visible only because they are misaligned with those from the top modular ring.

Some of the modular rings 312 of the heat exchanger 310 used in the reactor 300 are preferably wash coated with a PrOx catalyst 365. The PrOx catalyst 365 preferably adheres well to the modular rings. For example, when the fins 364 are cast aluminum, an aluminum oxide layer on the fin surface is ideal for adhesion of alumina based catalyst washcoating. The catalyst may be any of the well known PrOx catalysts discussed elsewhere in this application, or in the prior art. It can be appreciated that when the heat exchanger is used in other types of applications, a catalyst other than a PrOx catalyst may be washcoated onto the modular rings 312. In certain instances it may be beneficial to include a wash coated catalyst on an interior surface of the tubular section of the modular rings.

The modular nature of the heat exchanger 310 allows for great flexibility in maintaining a fluid temperature profile within a fluid flow. Individual modular rings 312 may have different properties form other rings on the same heat exchanger. For example, a heat exchanger may include a first modular ring which is wash coated with a PrOx catalyst, a second modular ring which is not wash coated, and a third modular ring which is again wash coated with a PrOx catalyst. Numerous variations of this concept immediately come to mind and are well within the skill of one of ordinary skill in the art.

Other properties also may vary between individual modular rings within the same heat exchanger. These may include different number of fins, spacing between fins, alignment of fins, material comprising the fins, coating on the fins, heat transfer coefficient, surface area, shape of individual fins, size of the individual fins, orientation with respect to the flow tubes, and type of attachment to the flow tube.

The reactor 300 of FIG. 7 generally receives reformate gas at approximately 300° C. to which air is added at the reformate inlet 302. Liquid water generally enters the heat exchanger 310 at the opposite end, and flows in a countercurrent direction to the reformate. The water generally turns to a two-phase water steam mixture with in the heat exchanger 310. The heat exchanger preferably maintains a desirable thermal profile within the reactor 300. Reaction of the reformate is preferably catalyzed by the PrOx catalyst 365. The now reacted reformate leaves the reactor 300 through reformate outlet 304. One advantage of this reactor is it does not generally require additional air inlets, although, the use of them is contemplated as needed.

Figure 16:
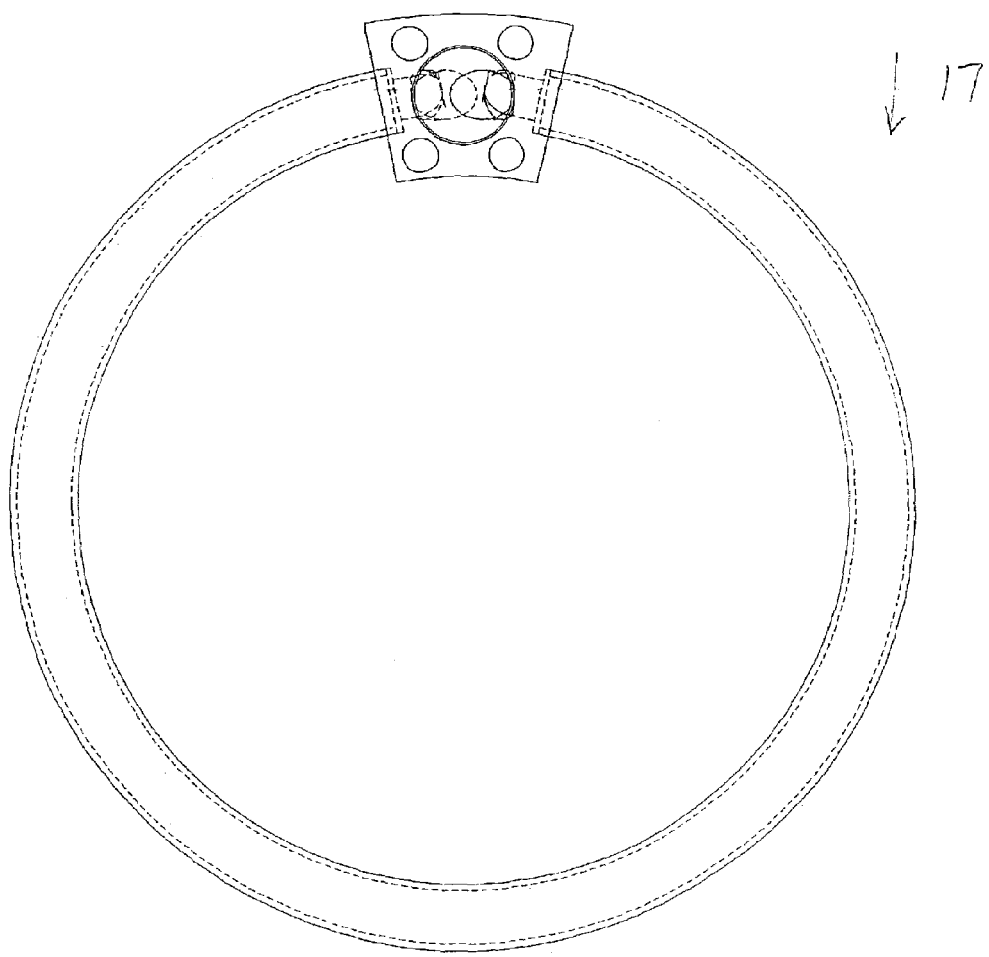
FIG. 16 is front view of a heat exchanger component according to another embodiment of the present invention.
Figure 17:
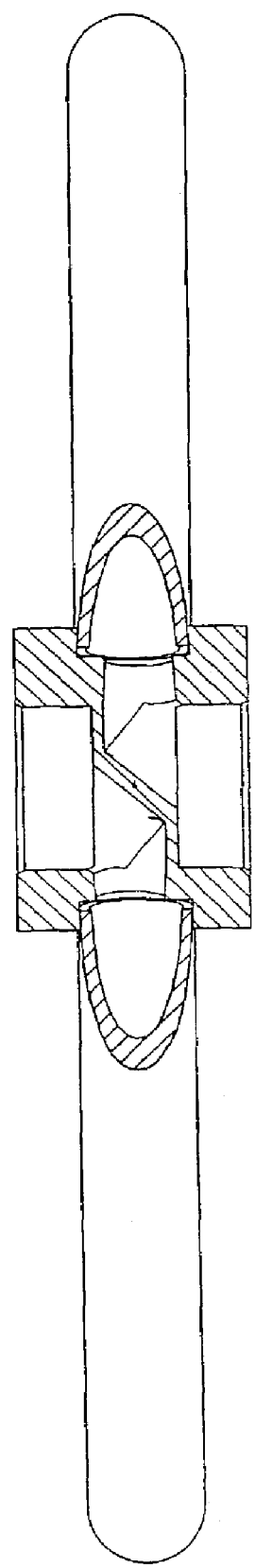
FIG. 17 is a cut away top view of the heat exchanger component of FIG. 16 along line 17.

The heat exchanger 310 used in conjunction with reactor 300 provides a benefit in that it is easily manufactured. First, a tubular conduit of a first metal is formed into a tubular section of the desired shape and size. The first metal is preferably stainless steel. The tubular section is shown in FIGS. 16 and 17 with an attached manifold 320. The tubular section is placed in a die, and a second metal is cast onto an outer surface of the tubular section in the form of fins. Generally, the manifold 320 is not connected to the tubular section during die casting. The second metal is preferably aluminum. The fins are then optionally wash coated with a catalyst for promoting a desired reaction in a heat transfer fluid intended to contact the fins during heat transfer operations. The final step in assembling the heat exchanger 310 is connecting the tubular sections to a connector and connecting at least two of the tubular sections together with the connector. The number of tubular sections connected together will vary depending on system requirements.

Another embodiment of a PrOx reactor according to the present invention is shown in FIG. 18 as reference numeral 400. The reactor 400 generally includes a plurality of plates 402 which are connected such that heat transfer may be performed between two fluids traveling through channels 404 formed between adjacent plates 402. In the PrOx reactor 400 the two fluids are generally reformate, water, or a water/steam mixture. An interior surface 406 of the plates 402 through which the reformate is routed is preferably wash coated with a PrOx catalyst 408. Alternatively, a portion of the channel may be packed with a PrOx catalyst in any of the well know catalyst forms discussed elsewhere in this application. The reactor 400 is generally understood as a plate and frame type heat exchanger with a reforming capacity provided by the inclusion of a catalyst.

Flow through the reactor 400 is generally countercurrent as shown in FIG. 19. Reformate generally enters the reactor 400 through a reformate inlet 410. Liquid water generally enters the reactor 400 through a water inlet 412. The reformate and water/steam then generally proceed through the reactor exchanging heat through the plates 402 which separate the channels 404 through which they flow. The flow through the channels is preferably directed and made turbulent by the presence of raised protuberances 414. The pattern of the protuberances 414 may be selected based on the degree to which it is desirable to make the fluid path tortuous. One system consideration is that additional pressure is required to move a fluid through a tortuous fluid path. It is preferable to make the fluid path within a channel 404 travel diagonally across a plate 402. The flow of fluids between channels is done through openings 403 in the plates 402.

The reformate generally exits the reactor through a reformate outlet 416. The water/steam generally exits the reactor through a water/steam outlet 418. While the two fluids are shown here entering and exiting the reactor 400 through different end plates 420, 422, in other embodiments, both fluids enter and exit the system through the same end plate 420, and the plates 402 and channels 404 are arranged accordingly as is well understood by one of ordinary skill in the art.

While the specific embodiments have been illustrated and described, numerous modifications come to mind without significantly departing from the spirit of the invention, and the scope of protection is only limited by the scope of the accompanying claims.

We claim:

1. A reactor for the selective oxidation of carbon monoxide in a hydrogen rich reformate stream, comprising:

a reactor body;

an inlet for the addition of a reformate stream to the reactor body;

at least one oxygen inlet for the addition of oxygen to the reformate stream;

a first catalyst suitable for selective oxidation of carbon monoxide, located within the reactor body;

a second catalyst suitable for selective oxidation of carbon monoxide, located within the reactor body;

a first heat exchanger, having an inlet and an outlet, for removing heat from the first catalyst and the reformate;

a first stream of water flowing through the first heat exchanger;

a second heat exchanger, having an inlet and an outlet, for removing heat from the second catalyst and the reformate;

a second stream of water flowing through the second heat exchanger;

wherein the first stream of water enters the first heat exchanger at least partially as liquid water; and the second stream water enters the second heat exchanger at least partially as liquid water;

wherein said first stream of water and second stream of water are two phase mixtures of water and steam throughout at least a portion of the reformate flow path.

2. The reactor of claim 1, wherein the first catalyst is in a form selected from the group consisting of pellets, foam, a monolith, a powder, and a layer wash-coated onto a component of the first heat exchanger, and/or the second catalyst is in a form selected from the group consisting of pellets, foam, a monolith, a powder, and a layer wash-coated onto a component of the second heat exchanger.

3. The reactor of claim 1, wherein the first heat exchanger comprises a cooling tube contiguous with the first catalyst, and/or the second heat exchanger comprises a cooling tube contiguous with the second catalyst.

4. The reactor of claim 1, wherein the first or the second heat exchanger comprises a cooling jacket located proximate to an exterior wall of the reactor.

5. The reactor of claim 1 wherein the portion of the reformate flow path that is in heat exchange with one of liquid water and two phase water is substantially equal to the portion of the reformate flow path that contains catalyst.

6. The reactor of claim 1, further comprising a core in the reactor around which the stream of reformate is routed; wherein the catalyst is arranged about the core.

7. The reactor of claim 6 wherein the core is hollow.

8. The reactor of claim 6, further comprising a unit for processing of a hydrocarbon fuel located within the core.

9. The reactor of claim 8, wherein the unit comprises a low temperature shift unit.

10. The reactor of claim 1, wherein the first catalyst and the second catalyst are the same catalyst or different catalysts.

11. A reactor for the selective oxidation of carbon monoxide in a hydrogen rich reformate stream, the reactor comprising:
    a reactor body;
    an inlet for the addition of a reformate stream to the reactor body;
    at least one inlet for the addition of oxygen to the reformate stream; and
    a heat exchanger comprising a cooling tube having fins affixed thereon,
    wherein the heat exchanger is washcoated with a catalyst suitable for selective oxidation of carbon monoxide contained within the reactor body and a cooling medium flows through the cooling tube.

12. The reactor of claim 11, wherein the cooling medium comprises two phase water in liquid and gaseous phases.

13. The reactor of claim 11, wherein the cooling medium flows in a generally countercurrent direction to the direction of flow of the reformate.

14. The reactor of claim 11, wherein the cooling medium flows in a generally concurrent direction to the flow of the reformate.

15. The reactor of claim 11 further comprising a core contained within the reactor body around which the stream of reformate flows.

16. The reactor of claim 15 wherein at least a section of the cooling tube in the heat exchanger is helical and the helical section of the cooling tube is arranged about the core within the reactor body.

17. The reactor of claim 16, further comprising additional inlets through which oxygen is introduced to the reformate stream.

18. The reactor of claim 15 wherein the volume of the core is in the range of from about 10 percent to about 95 percent of the volume of the reactor.

19. A reactor for the selective oxidation of carbon monoxide in a hydrogen rich reformate stream, comprising:
    a reactor body having a reformate stream with a flow direction therein;
    a tube carrying the reformate stream having an inlet to the reactor body;
    a tube carrying an oxygen stream having an inlet to the tube carrying the reformate stream;
    a first helical tube carrying a two phase system of water and steam in a direction countercurrent to the flow direction of the reformate stream;
    a bed of steel shot through which the first helical tube travels and over which the reformate stream flows;
    a first bed of a selective oxidation catalyst located downstream of the bed of steel shot;
    a manifold into which the reformate stream flows;
    a oxygen inlet into the manifold;
    a second bed of a selective oxidation catalyst into which the reformate stream is flowed from the manifold;
    a second helical tube carrying water in a direction countercurrent to the direction of flow of the reformate upon exiting the manifold;
    a riser extending from the helical tube through the second bed of catalyst;
    a second bed of steel shot through which the second helical tube travels and over which the reformate stream flows;
    an outlet for the reformate stream, wherein the riser is in fluid communication with the first helical tube outside of the reactor body.

* * * * *